(12) United States Patent
Marpe et al.

(10) Patent No.: US 7,379,608 B2
(45) Date of Patent: May 27, 2008

(54) ARITHMETIC CODING FOR TRANSFORMING VIDEO AND PICTURE DATA UNITS

(75) Inventors: Detlev Marpe, Berlin (DE); Heiko Schwarz, Berlin (DE); Thomas Wiegand, Berlin (DE)

(73) Assignee: Fraunhofer-Gesellschaft zur Foerderung der angewandten Forschung, e.V., Munich (DE)

( * ) Notice: Subject to any disclaimer, the term of this patent is extended or adjusted under 35 U.S.C. 154(b) by 910 days.

(21) Appl. No.: 10/728,426

(22) Filed: Dec. 4, 2003

(65) Prior Publication Data

US 2005/0123207 A1   Jun. 9, 2005

(51) Int. Cl.
*G06K 9/36* (2006.01)
*G06K 9/46* (2006.01)

(52) U.S. Cl. .................. 382/247; 382/233; 382/238; 382/239

(58) Field of Classification Search ................. None
See application file for complete search history.

(56) References Cited

U.S. PATENT DOCUMENTS

| 5,091,782 | A | 2/1992 | Krause et al. |
| 5,140,417 | A | 8/1992 | Tanaka et al. |
| 5,227,878 | A | 7/1993 | Puri et al. |
| 5,272,478 | A | 12/1993 | Allen |
| 5,347,308 | A | 9/1994 | Wai |
| 5,363,099 | A | 11/1994 | Allen |
| 5,434,622 | A | 7/1995 | Lim |
| 5,471,207 | A | 11/1995 | Zandi et al. |
| 5,500,678 | A * | 3/1996 | Puri ........................ 348/408.1 |
| 5,504,530 | A * | 4/1996 | Obikane et al. ....... 375/240.14 |
| 5,659,631 | A * | 8/1997 | Gormish et al. ............ 382/166 |
| 5,767,909 | A * | 6/1998 | Jung .................... 375/240.18 |

(Continued)

OTHER PUBLICATIONS

Wiegand, Thomas, et al; "Draft ITU-T; Recommendation and Final Draft International Standard of Joint Video Specification; ITU-T Rec. H.264; ISO/IEC 1449-10 ACV"; 8th Meeting: Geneva, Switzerland, May 23-27, 2003.

(Continued)

*Primary Examiner*—Wenpeng Chen
*Assistant Examiner*—Yuzhen Ge
(74) *Attorney, Agent, or Firm*—Glenn Patent Group; Michael A. Glenn

(57) ABSTRACT

A method for encoding a video frame or picture comprises dividing up the video frame or the picture in portions of a first type associated with a first scanning pattern, and portions of a second type associated with a second scanning pattern. Data corresponding to a predetermined of the portions of the video frame or picture is transformed into a two-dimensional transform coefficient array. Fhe transform coefficients are precoded in order to obtain transform data units. One of a first and a second set of context models is chosen depending on as to whether the predetermined portion is a portion of a type being associated with the first or the second scanning pattern. One context model of the chosen one of the first and the second set of context models is assigned to the transform data unit based on the scanning position assigned to the predetermined transform coefficient. Finally, the transform data unit or a sub-unit thereof is arithmetically encoded into a coded bit stream based on the probability estimation with which the assigned context model is associated.

20 Claims, 17 Drawing Sheets

U.S. PATENT DOCUMENTS

| | | | |
|---|---|---|---|
| 5,818,369 A | | 10/1998 | Withers |
| 5,949,912 A | * | 9/1999 | Wu .......................... 382/246 |
| 5,992,753 A | | 11/1999 | Xu |
| 6,075,471 A | | 6/2000 | Kimura et al. |
| 6,222,468 B1 | | 4/2001 | Allen |
| 6,263,115 B1 | * | 7/2001 | Cho .......................... 382/243 |
| 6,265,997 B1 | | 7/2001 | Nomizu |
| 6,275,533 B1 | | 8/2001 | Nishi |
| 6,298,160 B1 | | 10/2001 | Goertzen |
| 6,411,231 B1 | | 6/2002 | Yanagiya et al. |
| 6,522,651 B2 | | 2/2003 | Herrmann |
| 6,532,309 B1 | * | 3/2003 | Sato et al. ................... 382/248 |
| 6,574,226 B1 | | 6/2003 | Nakano et al. |
| 6,574,243 B2 | | 6/2003 | Tsunoda et al. |
| 6,603,815 B2 | * | 8/2003 | Suzuki et al. ............ 375/240.2 |
| 6,674,477 B1 | | 1/2004 | Yamaguchi et al. |
| 6,677,868 B2 | | 1/2004 | Kerofsky et al. |
| 6,771,197 B1 | | 8/2004 | Yedidia et al. |
| 6,795,584 B2 | | 9/2004 | Karczewicz et al. |
| 6,812,873 B1 | | 11/2004 | Siohan et al. |
| 6,927,710 B2 | | 8/2005 | Linzer et al. |
| 6,980,596 B2 | | 12/2005 | Wang et al. |
| 6,987,888 B2 | * | 1/2006 | Wang et al. ................ 382/236 |
| 7,177,475 B2 | * | 2/2007 | Wang et al. ................ 382/236 |
| 2004/0136461 A1 | | 7/2004 | Kondo et al. |
| 2004/0268329 A1 | | 12/2004 | Prakasam |
| 2005/0053296 A1 | | 3/2005 | Srinivasan et al. |
| 2005/0169374 A1 | | 8/2005 | Marpe et al. |

OTHER PUBLICATIONS

Wiegand, Thomas, et al; "Overview of the H.263/AVC Video Coding Standard"; IEEE Transaction on Circuit and Systems for Video Technology, vol. 13 No. 7, Jul.

ISO/IEC 12818-2: 1995 (E) Specification.

Sullivan, Gary: "Draft Text of Recommendation H.263 Version 2 ("H.263+") for Decision"; Study Group 16—Contribution COM-999; Study Period 1997-2000.

International Organization For Standardization; Organization Normalizaion;"Information Technology—Coding of Audio Visual Objects—Part 2: Visual"; N4350.

Gonzales, C.A., et al.; "DCT Coding for Motion Video Storage using Adaptive Arithmetic Coding"; Signal Proceesing; Image Communication 2 (1960); vol. 2, No. 2, pp. 145-154; Aug. 1990.

Marpe, Detlev, et al; "Adaptive Codes for H.26L"; ITU-T Telecommunications Standardization Sector; Video Coding Experts Group Document; Document VCEG-L13; Twelfth Meeting: Eibsee, Germany, Jan. 9-12, 2001.

Marpe, Detlev, et al; "Further Results for CABAC entropy coding scheme"; ITU-T Telecommunications Standardization Sector; Viedo Coding Experts Group Document; Document VCEG-M59; Thirteenth Meeting: Austin, Texas, USA Apr. 2-4, 2001.

Marpe, Detlev, et al; "Improved CABAC"; ITU-T Telecommunications Standardization Sector; Video Coding Experts Group Document; Document VCEG-018r1; 15th Meeting: Pattava, Thailand, Dec. 4-6, 2001.

Marpe, Detlev, et al; "New Results on Improved CABAC"; Joint Video Team of ISO/IEC MEG & ITU-T VCEG, Document JVT-B101; 2nd Meeting: Geneva, CH, Jan. 29-Feb. 1, 2002.

Schwarz, Heiko, et al; "Improved CABAC"; Joint Video Team of ISO/IEC MPEG & ITU-T VCEG; Document JVT-C060; 3rd Meeting: Fairfax, Virgina, USA, May 6-10, 2002.

Marpe, Detlev, et al; "Fast Arithmetic Coding for CABAC"; Joint Video Team of ISO/IEC MPEG & ITU-T VCEG; Document JVT-C060; 3rd Meeting: Fairfax, VIrginia, USA, May 6-10, 2002.

Schwarz, Heiko, et al.; "CABAC and Slices"; Joint Video Team of ISO/IEC MPEG & ITU-T VCEG; Document JVT-D020r1; 4th Meeting: Klagenfurt, Austria, Jul. 22-26, 2002.

Karczewicz, Marta, et al.; "Analysis and Simplification of Intra Prediction"; Joint Video Team of ISO/IEC MPEG & ITU-T VCEG; Document JVT-D025; 4th Meeting: Klagenfurt, Austria, Jul. 22-26, 2002.

Marpe, Detlev, et al.; "Proposed Cleanup changes for CABAC"; Joint Video Team of ISO/IEC MPEG & ITU-T VCEG; Document: JVT-E059; 5th Meeting: Geneva, CH, Oct. 9-17, 2002.

Bossen, Frank; "CABAC cleanup and complexity reduction"; Joint Video Team of ISO/IEC MPEG & ITU-T VCEG; Document: JVT-Exxx; 5th Meeting: Geneva, Switzerland, Oct. 2002.

Marpe, Detlev, et al; "Final CABAC cleanup"; Joint Video Team of ISO/IEC MPEG & ITU-T VCEG; Document: JVT-F039: 6th Meeting: Awaji, Island, JP, Dec. 5-13, 2002.

Marpe, Detlev and Hans L. Cycon; "Very Low Bit—Rate Video Coding Using Wavelet—Based Techniques"; IEEE Transactions on Circuits and Systems for Video Technology; vol. 9, No. 1, Feb. 1999.

Heising, G., et al; "Wavelet-based very low Bitrate coding using image warping"; IEE Proc.-Vis. Image Signal Process, vol. 148, No. 2, Apr. 2001.

Choi, Seung-Jong, and John W. Woods; "Motion-Compensated 3-D Subband Coding of Video"; IEEE Transactions on Image Processing, vol. 8, No. Feb. 1999.

Said, Amir and William A. Pearlman; "A new fast and efficient image codec based on set partitioning in hierarchical trees"; IEEE Int. Smyp on Circuits and Systems, Chigcago, IL May 1993.

Marpe, Detlev and Hans L. Cycon; "Efficient Pre-Coding Techniques of Wavelet-Based Image Compression"; Proc. Int. Picture Coding Symposium , pp. 45-50, 1997.

Rissanen, Jorma and Glen G. Landgon, Jr; "Universal Modeling and Coding"; IEEE Transactions on Information Theory; vol. It-27, No. 1, Jan. 1981.

Rissanen, Jorma; "Universal Coding, Information, Prediction, and Estimation"; IEEE Transactions on Information Theory; vol. It-30, No. 4, Jul. 1984.

Weinberger, Marcelo J., et al; "Applications of universal context modeling to lossless compression of grey-scale images"; IEEE Transactions on Imaging Processing; vol. 5, No. 4, Apr. 1996.

Teuhola, Jukka; "A Compression Method of Clustered Bit-Vektors"; Information Processing Letters, vol. 7, No. 6, pp. 308-311, Oct. 1978.

Gallager, Robert G. and David C. Van Voorhis; "Optimal Source Codes for Geometrically Distributed Integer Alphabets"; IEEE Transactions on Information Technology; pp. 228-230, March 1975.

Mrak, Marta, et al.; "A Context Modeling Algorithm and its Application in Video Compression"; Fraunhofer-Institute HHI, Berlin, Germany.

Pennebaker, W.B., et al; "An overview of the basic principle of the Q-Coder adaptive binary arithmetic coder"; IBM. J. Res. Develop, vol. 32, No. 6, Nov. 1988.

Rissanen, Jorma and K. M. Mohiuddin; :A multiplication-free multialphabet arithmetic code ; IEEE Transactions on Communications; vol. 37, No. 2, Feb. 1989.

Howard, Paul G. and Jeffrey Scott Viter; "Practical implementations of arithmetic code"; Brown University, Department of Computer Science, Technical Report No. 92-18; Revised version, Apr. 1992, Formerly Technical Report No. CS-91-45.

"Sample Data Coding"; Chapter 12, pp. 473-484.

Moffat, Alistair, et al; "Arithmetic Coding Revisited"; ACM Transactions on Information Systems vol. 16, No. 3, pp. 256-294, Jul. 1998.

Wiegand, Thomas, et al; "Rate-Constrained Coder Control and Comparison of Video Coding Standards"; IEEE Transactions on Circuits and Systems for VideoTechnology; vol. 13, No. 7, Jul. 2003.

Wiegand, Thomas; "Draft ITU-T Recommendation and Final Draft International Standard of Joint Video Specification (ITU-T Rec. H.264; ISO/IEC; 14496-10 AVC)"; Document: JVT-G050; 7th Meeting: Pattaya, Thailand, Mar. 7-14, 2003.

"Video Codec For Audiovisual Services at p•64 kbit/s"; International Telecommunication Union; H.261 (Mar. 1993).

Wenger, Stephen; "H.264/AVC Over IP"; IEEE Transactions on Circuits and Systems for VideoTechnology; vol. 13, No. 7, Jul. 2003.

Stockhammer, Thomas, et al; "H.264/AVCinWireless Environments"; IEEE Transactions on Circuits and Systems for VideoTechnology; vol. 13, No. 7, Jul. 2003.

Wedi, Thomas and Hans Georg Musmann; "Motion-and Aliasing-Compensated Prediction for Hybrid Video Coding"; IEEE Transactions on Circuits and Systems for VideoTechnology; vol. 13, No. 7, Jul. 2003.

Wiegand, Thomas, et al; "Long Term Memory Motion-Compensated Prediction"; IEEE Transactions on Circuits and Systems for VideoTechnology; vol. 9, No. 1, Feb. 1999.

Flierl, Markus, et al; "A locally design algorithm block-based multi-hypothesis motion-compensated prediction"; Proceedings of the IEEE DCC, pp. 239-248, Snowbird, Utah; Mar. 1988.

Flierl, Markus and Bernd Girod; "Generalized B Pictures and the Draft H.364/AVC Codec", IEEE Transactions on Circuits and Systems for VideoTechnology; vol. 13, No. 7, Jul. 2003.

Karczewicz, Marta and Ragip Kurceren; "The SP—and SI—Frames Design for H.264/AVC"; IEEE Transactions on Circuits and Systems for VideoTechnology; vol. 13, No. 7, Jul. 2003.

Marpe, Detlev et al; "Context-Based Adaptive Binary Arthmetic Coding in the H.264/AVC Video Compression Standard"; IEEE Transactions on Circuits and Systems for VideoTechnology; vol. 13, No. 7, Jul. 2003.

Malvar, Henrique S. et al;"Low-complexity Transformed Quantization in H.264/AVC"; IEEE Transactions on Circuits and Systems for VideoTechnology; vol. 13, No. 7, Jul. 2003.

List, Peter, et al; "Adaptive Deblocking Filter"; IEEE Transactions on Circuits and Systems, for VideoTechnology; vol. 13, No. 7, Jul. 2003.

Ribas-Cobera, Jordi et al; "A Generalized Hypothetical Reference Decoder for H. 264/AVC"; IEEE Transactions on Ciruits and Systems for VideoTechnology; Vol. 13, No. 7, Jul. 2003.

Marpe, Detlev et al; "Proposed Editorial Changes and Cleanup of CABAC"; Joint Video Team of ISO/IEC MPEG & ITU-T VCEG; Document JVT-D019; 4th Meeting; Klagenfurt, Austria, Jul. 22-26, 2002.

Wiegand, Thomas: "Study of Final Committee Draft of Joint Video Specification (ITU-T Rec. H.264, ISO/IEC 14496-10 AVC0)"; Joint Video Team of ISO/IEC MPEG & ITU-T VCEG; Document JVT-F100d2; 6th Meeting: Awaji, Island, JP, Dec. 5-13, 2002.

The Concept of a Random Variable, pp. 82-84.

Marpe, Detlev, et al; "Improved CABAC"; ITU—Telecommunications Standardization Sector; VCEG-018r1; 15th Meeting: Pattaya, Thailand, Dec. 4-6, 2001.

Atul Puri et al., "Adaptive frame/field motion compensated video coding,"Feb. 1, 1993, Signal Processing Image Communication, vol. 5, No. 1/02, pp. 39-58.

* cited by examiner

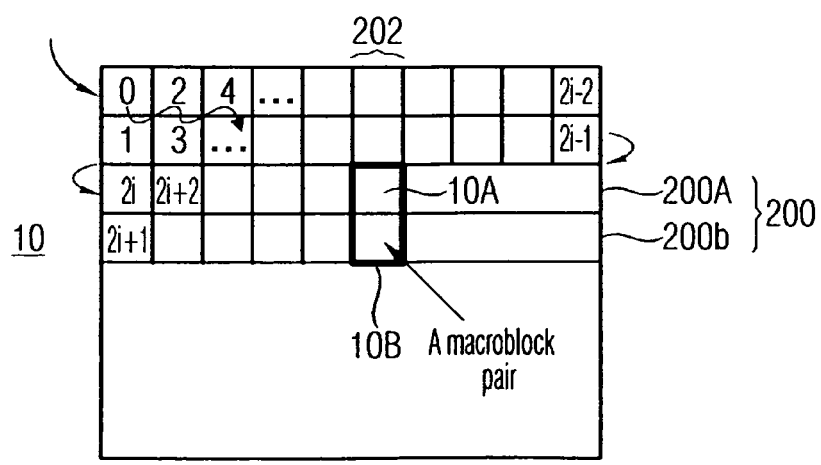

FIG 4A pixel row number

10B

| | X1 | X2 | X3 | X4 | X5 | X6 |
|---|---|---|---|---|---|---|
| 2n+1 | X 1 | X 2 | X 3 | X 4 | X 5 | X 6 |
| 2n+2 | □ 11 | □ 12 | □ 13 | □ 14 | □ 15 | □ 16 |
| 2n+3 | X 21 | X 22 | X 23 | X 24 | X 25 | X 26 |
| 2n+4 | □ 31 | □ 32 | □ 33 | □ 34 | □ 35 | □ 36 |
| 2n+5 | X 41 | X 42 | X 43 | X 44 | X 45 | X 46 |
| 2n+6 | □ 51 | □ 52 | □ 53 | □ 54 | □ 55 | □ 56 |
| ⋮ | | | | | | |
| 2n+10 | □ 91 | □ 92 | □ 93 | □ 94 | □ 95 | □ 96 |
| 2n+11 | X 101 | X 102 | X 103 | X 104 | X 105 | X 106 |
| 2n+12 | □ 111 | □ 112 | □ 113 | □ 114 | □ 115 | □ 116 |

254

250

| X 1 | X 2 | X 3 | X 4 | X 5 | X 6 |
|---|---|---|---|---|---|
| □ 11 | □ 12 | □ 13 | □ 14 | □ 15 | □ 16 |
| X 21 | X 22 | X 23 | X 24 | X 25 | X 26 |
| □ 31 | □ 32 | □ 33 | □ 34 | □ 35 | □ 36 |

252

| □ 61 | □ 62 | □ 63 | □ 64 | □ 65 | □ 66 |
|---|---|---|---|---|---|
| X 71 | X 72 | X 73 | X 74 | X 75 | X 76 |
| □ 81 | □ 82 | □ 83 | □ 84 | □ 85 | □ 86 |

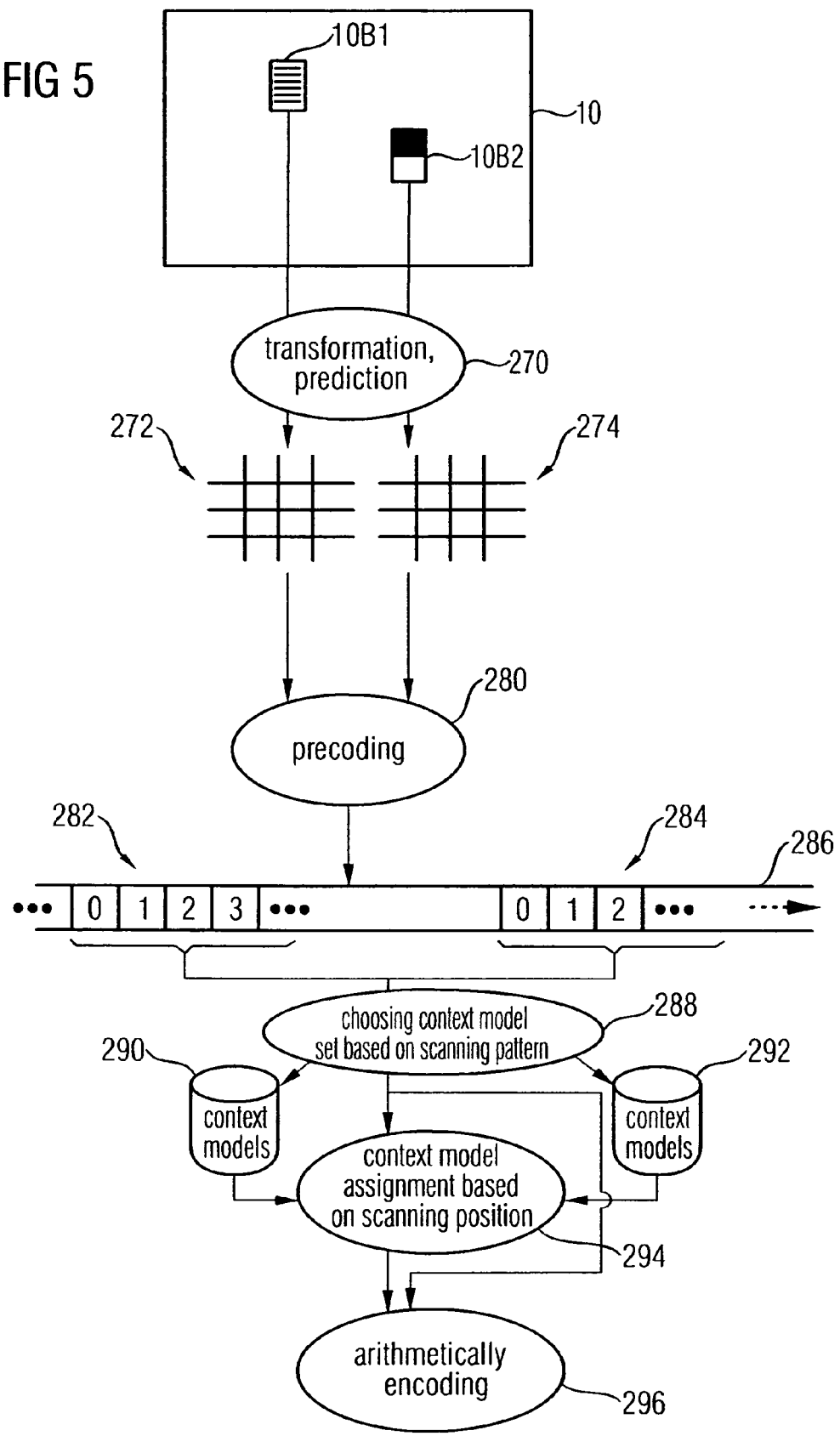

| Scanning position | 0 | 1 | 2 | 3 | 4 | 5 | 6 | 7 | 8 |
|---|---|---|---|---|---|---|---|---|---|
| Transf. coefficient levels | 9 | 0 | -5 | 3 | 0 | 0 | -1 | 0 | 1 |
| significant_coeff_flag | 1 | 0 | 1 | 1 | 0 | 0 | 1 | 0 | 1 |
| last_significant_coeff_flag | 0 |  | 0 | 0 |  |  | 0 |  | 1 |

FIG 11

```
1   residual_block_cabac( coeffLevel, maxNumCoeff ) {
2     coded_block_flag
3     if( coded_block_flag ) {
4       numCoeff = maxNumCoeff
5       i = 0
6       do {
7         significant_coeff_flag[ i ]
8         if( significant_coeff_flag[ i ] ) {
9           last_significant_coeff_flag[ i ]
10          if( last_significant_coeff_flag[ i ] ) {
11            numCoeff = i + 1
12            for( j = numCoeff; j < maxNumCoeff; j++ )
13              coeffLevel[ j ] = 0
14          }
15        }
16        i++
17      } while( i < numCoeff-1 )
18      coeff_abs_level_minus1[ numCoeff-1 ]
19      coeff_sign_flag[ numCoeff-1 ]
20      coeffLevel[ numCoeff-1 ] = ( coeff_abs_level_minus1[numCoeff-1]+1 )
                                    * ( 1 - 2 * coeff_sign_flag[numCoeff-1] )
21      for( i = numCoeff-2; i >= 0; i-- ) {
22        if( significant_coeff_flag[ i ] ) {
23          coeff_abs_level_minus1[ i ]
24          coeff_sign_flag[ i ]
25          coeffLevel[ i ] = ( coeff_abs_level_minus1[ i ] + 1 ) *
                              ( 1 - 2 * coeff_sign_flag[ i ] )
26        } else
27          coeffLevel[ i ] = 0
28      }
29    } else
30      for( i = 0; i < maxNumCoeff; i++ )
31        coeffLevel[ i ] = 0
32  }
```

FIG 18A

| ctxIdx | I and SI slices | | Value of cabac_init_idc | | | | | | ctxIdx | I and SI slices | | Value of cabac_init_idc | | | | | |
|---|---|---|---|---|---|---|---|---|---|---|---|---|---|---|---|---|---|
| | | | 0 | | 1 | | 2 | | | | | 0 | | 1 | | 2 | |
| | m | n | m | n | m | n | m | n | | m | n | m | n | m | n | m | n |
| 105 | -7 | 93 | -2 | 85 | -13 | 103 | -4 | 86 | 136 | -13 | 101 | 5 | 53 | 0 | 58 | -5 | 75 |
| 106 | -11 | 87 | -6 | 78 | -13 | 91 | -12 | 88 | 137 | -13 | 91 | -2 | 61 | -1 | 60 | -8 | 80 |
| 107 | -3 | 77 | -1 | 75 | -9 | 89 | -5 | 82 | 138 | -12 | 94 | 0 | 56 | -3 | 61 | -21 | 83 |
| 108 | -5 | 71 | -7 | 77 | -14 | 92 | -3 | 72 | 139 | -10 | 88 | 0 | 56 | -8 | 67 | -21 | 64 |
| 109 | -4 | 63 | 2 | 54 | -8 | 76 | -4 | 67 | 140 | -16 | 84 | -13 | 63 | -25 | 84 | -13 | 31 |
| 110 | -4 | 68 | 5 | 50 | -12 | 87 | -8 | 72 | 141 | -10 | 86 | -5 | 60 | -14 | 74 | -25 | 64 |
| 111 | -12 | 84 | -3 | 68 | -23 | 110 | -16 | 89 | 142 | -7 | 83 | -1 | 62 | -5 | 65 | -29 | 94 |
| 112 | -7 | 62 | 1 | 50 | -24 | 105 | -9 | 69 | 143 | -13 | 87 | 4 | 57 | 5 | 52 | 9 | 75 |
| 113 | -7 | 65 | 6 | 42 | -10 | 78 | -1 | 59 | 144 | -19 | 94 | -6 | 69 | 2 | 57 | 17 | 63 |
| 114 | 8 | 61 | -4 | 81 | -20 | 112 | 5 | 66 | 145 | 1 | 70 | 4 | 57 | 0 | 61 | -8 | 74 |
| 115 | 5 | 56 | 1 | 63 | -17 | 99 | 4 | 57 | 146 | 0 | 72 | 14 | 39 | -9 | 69 | -5 | 35 |
| 116 | -2 | 66 | -4 | 70 | -78 | 127 | -4 | 71 | 147 | -5 | 74 | 4 | 51 | -11 | 70 | -2 | 27 |
| 117 | 1 | 64 | 0 | 67 | -70 | 127 | -2 | 71 | 148 | 18 | 59 | 13 | 68 | 18 | 55 | 13 | 91 |
| 118 | 0 | 61 | 2 | 57 | -50 | 127 | 2 | 58 | 149 | -8 | 102 | 3 | 64 | -4 | 71 | 3 | 65 |
| 119 | -2 | 78 | -2 | 76 | -46 | 127 | -1 | 74 | 150 | -15 | 100 | 1 | 61 | 0 | 58 | -7 | 69 |
| 120 | 1 | 50 | 11 | 35 | -4 | 66 | -4 | 44 | 151 | 0 | 95 | 9 | 63 | 7 | 61 | 8 | 77 |
| 121 | 7 | 52 | 4 | 64 | -5 | 78 | -1 | 69 | 152 | -4 | 75 | 7 | 50 | 9 | 41 | -10 | 66 |
| 122 | 10 | 35 | 1 | 61 | -4 | 71 | 0 | 62 | 153 | 2 | 72 | 16 | 39 | 18 | 25 | 3 | 62 |
| 123 | 0 | 44 | 11 | 35 | -8 | 72 | -7 | 51 | 154 | -11 | 75 | 5 | 44 | 9 | 32 | -3 | 68 |
| 124 | 11 | 38 | 18 | 25 | 2 | 59 | -4 | 47 | 155 | -3 | 71 | 4 | 52 | 5 | 43 | -20 | 81 |
| 125 | 1 | 45 | 12 | 24 | -1 | 55 | -6 | 42 | 156 | 15 | 46 | 11 | 48 | 9 | 47 | 0 | 30 |
| 126 | 0 | 46 | 13 | 29 | -7 | 70 | -3 | 41 | 157 | -13 | 69 | -5 | 60 | 0 | 44 | 1 | 7 |
| 127 | 5 | 44 | 13 | 36 | -6 | 75 | -6 | 53 | 158 | 0 | 62 | -1 | 59 | 0 | 51 | -3 | 23 |
| 128 | 31 | 17 | -10 | 93 | -8 | 89 | 8 | 76 | 159 | 0 | 65 | 0 | 59 | 2 | 46 | -21 | 74 |
| 129 | 1 | 51 | -7 | 73 | -34 | 119 | -9 | 78 | 160 | 21 | 37 | 22 | 33 | 19 | 38 | 16 | 66 |
| 130 | 7 | 50 | -2 | 73 | -3 | 75 | -11 | 83 | 161 | -15 | 72 | 5 | 44 | -4 | 66 | -23 | 124 |
| 131 | 28 | 19 | 13 | 46 | 32 | 20 | 9 | 52 | 162 | 9 | 57 | 14 | 43 | 15 | 38 | 17 | 37 |
| 132 | 16 | 33 | 9 | 49 | 30 | 22 | 0 | 67 | 163 | 16 | 54 | -1 | 78 | 12 | 42 | 44 | -18 |
| 133 | 14 | 62 | -7 | 100 | -44 | 127 | -5 | 90 | 164 | 0 | 62 | 0 | 60 | 9 | 34 | 50 | -34 |
| 134 | -13 | 108 | 9 | 53 | 0 | 54 | 1 | 67 | 165 | 12 | 72 | 9 | 69 | 0 | 89 | -22 | 127 |
| 135 | -15 | 100 | 2 | 53 | -5 | 61 | -15 | 72 | | | | | | | | | |

FIG 18B

| ctxIdx | I and SI slices | | Value of cabac_init_idc | | | | | | ctxIdx | I and SI slices | | Value of cabac_init_idc | | | | | |
|---|---|---|---|---|---|---|---|---|---|---|---|---|---|---|---|---|---|
| | | | 0 | | 1 | | 2 | | | | | 0 | | 1 | | 2 | |
| | m | n | m | n | m | n | m | n | | m | n | m | n | m | n | m | n |
| 166 | 24 | 0 | 11 | 28 | 4 | 45 | 4 | 39 | 197 | 26 | -17 | 28 | 3 | 36 | -28 | 28 | -3 |
| 167 | 15 | 9 | 2 | 40 | 10 | 28 | 0 | 42 | 198 | 30 | -25 | 28 | 4 | 38 | -28 | 24 | 10 |
| 168 | 8 | 25 | 3 | 44 | 10 | 31 | 7 | 34 | 199 | 28 | -20 | 32 | 0 | 38 | -27 | 27 | 0 |
| 169 | 13 | 18 | 0 | 49 | 33 | -11 | 11 | 29 | 200 | 33 | -23 | 34 | -1 | 34 | -18 | 34 | -14 |
| 170 | 15 | 9 | 0 | 46 | 52 | -43 | 8 | 31 | 201 | 37 | -27 | 30 | 6 | 35 | -16 | 52 | -44 |
| 171 | 13 | 19 | 2 | 44 | 18 | 15 | 6 | 37 | 202 | 33 | -23 | 30 | 6 | 34 | -14 | 39 | -24 |
| 172 | 10 | 37 | 2 | 51 | 28 | 0 | 7 | 42 | 203 | 40 | -28 | 32 | 9 | 32 | -8 | 19 | 17 |
| 173 | 12 | 18 | 0 | 47 | 35 | -22 | 3 | 40 | 204 | 38 | -17 | 31 | 19 | 37 | -6 | 31 | 25 |
| 174 | 6 | 29 | 4 | 39 | 38 | -25 | 8 | 33 | 205 | 33 | -11 | 26 | 27 | 35 | 0 | 36 | 29 |
| 175 | 20 | 33 | 2 | 62 | 34 | 0 | 13 | 43 | 206 | 40 | -15 | 26 | 30 | 30 | 10 | 24 | 33 |
| 176 | 15 | 30 | 6 | 46 | 39 | -18 | 13 | 36 | 207 | 41 | -6 | 37 | 20 | 28 | 18 | 34 | 15 |
| 177 | 4 | 45 | 0 | 54 | 32 | -12 | 4 | 47 | 208 | 38 | 1 | 28 | 34 | 26 | 25 | 30 | 20 |
| 178 | 1 | 58 | 3 | 54 | 102 | -94 | 3 | 55 | 209 | 41 | 17 | 17 | 70 | 29 | 41 | 22 | 73 |
| 179 | 0 | 62 | 2 | 58 | 0 | 0 | 2 | 58 | 210 | 30 | -6 | 1 | 67 | 0 | 75 | 20 | 34 |
| 180 | 7 | 61 | 4 | 63 | 56 | -15 | 6 | 60 | 211 | 27 | 3 | 5 | 59 | 2 | 72 | 19 | 31 |
| 181 | 12 | 38 | 6 | 51 | 33 | -4 | 8 | 44 | 212 | 26 | 22 | 9 | 67 | 8 | 77 | 27 | 44 |
| 182 | 11 | 45 | 6 | 57 | 29 | 10 | 11 | 44 | 213 | 37 | -16 | 16 | 30 | 14 | 35 | 19 | 16 |
| 183 | 15 | 39 | 7 | 53 | 37 | -5 | 14 | 42 | 214 | 35 | -4 | 18 | 32 | 18 | 31 | 15 | 36 |
| 184 | 11 | 42 | 6 | 52 | 51 | -29 | 7 | 48 | 215 | 38 | -8 | 18 | 35 | 17 | 35 | 15 | 36 |
| 185 | 13 | 44 | 6 | 55 | 39 | -9 | 4 | 56 | 216 | 38 | -3 | 22 | 29 | 21 | 30 | 21 | 28 |
| 186 | 16 | 45 | 11 | 45 | 52 | -34 | 4 | 52 | 217 | 37 | 3 | 24 | 31 | 17 | 45 | 25 | 21 |
| 187 | 12 | 41 | 14 | 36 | 69 | -58 | 13 | 37 | 218 | 38 | 5 | 23 | 38 | 20 | 42 | 30 | 20 |
| 188 | 10 | 49 | 8 | 53 | 67 | -63 | 9 | 49 | 219 | 42 | 0 | 18 | 43 | 18 | 45 | 31 | 12 |
| 189 | 30 | 34 | -1 | 82 | 44 | -5 | 19 | 58 | 220 | 35 | 16 | 20 | 41 | 27 | 26 | 27 | 16 |
| 190 | 18 | 42 | 7 | 55 | 32 | 7 | 10 | 48 | 221 | 39 | 22 | 11 | 63 | 16 | 54 | 24 | 42 |
| 191 | 10 | 55 | -3 | 78 | 55 | -29 | 12 | 45 | 222 | 14 | 48 | 9 | 59 | 7 | 66 | 0 | 93 |
| 192 | 17 | 51 | 15 | 46 | 32 | 1 | 0 | 69 | 223 | 27 | 37 | 9 | 64 | 16 | 56 | 14 | 56 |
| 193 | 17 | 46 | 22 | 31 | 0 | 0 | 20 | 33 | 224 | 21 | 60 | -1 | 94 | 11 | 73 | 15 | 57 |
| 194 | 0 | 89 | -1 | 84 | 27 | 36 | 8 | 63 | 225 | 12 | 68 | -2 | 89 | 10 | 67 | 26 | 38 |
| 195 | 26 | -19 | 25 | 7 | 33 | -25 | 35 | -18 | 226 | 2 | 97 | -9 | 108 | -10 | 116 | -24 | 127 |
| 196 | 22 | -17 | 30 | -7 | 34 | -30 | 33 | -25 | | | | | | | | | |

FIG 18C

| ctxIdx | I and SI slices | | Value of cabac_init_idc | | | | | | ctxIdx | I and SI slices | | Value of cabac_init_idc | | | | | |
|---|---|---|---|---|---|---|---|---|---|---|---|---|---|---|---|---|---|
| | | | 0 | | 1 | | 2 | | | | | 0 | | 1 | | 2 | |
| | m | n | m | n | m | n | m | n | | m | n | m | n | m | n | m | n |
| 277 | -6 | 93 | -13 | 106 | -21 | 126 | -22 | 127 | 308 | -16 | 96 | -1 | 51 | -16 | 77 | -10 | 67 |
| 278 | -6 | 84 | -16 | 106 | -23 | 124 | -25 | 127 | 309 | -7 | 88 | 7 | 49 | -2 | 64 | 1 | 68 |
| 279 | -8 | 79 | -10 | 87 | -20 | 110 | -25 | 120 | 310 | -8 | 85 | 8 | 52 | 2 | 61 | 0 | 77 |
| 280 | 0 | 66 | -21 | 114 | -26 | 126 | -27 | 127 | 311 | -7 | 85 | 9 | 41 | -6 | 67 | 2 | 64 |
| 281 | -1 | 71 | -18 | 110 | -25 | 124 | -19 | 114 | 312 | -9 | 85 | 6 | 47 | -3 | 64 | 0 | 68 |
| 282 | 0 | 62 | -14 | 98 | -17 | 105 | -23 | 117 | 313 | -13 | 88 | 2 | 55 | 2 | 57 | -5 | 78 |
| 283 | -2 | 60 | -22 | 110 | -27 | 121 | -25 | 118 | 314 | 4 | 66 | 13 | 41 | -3 | 65 | 7 | 55 |
| 284 | -2 | 59 | -21 | 106 | -27 | 117 | -26 | 117 | 315 | -3 | 77 | 10 | 44 | -3 | 66 | 5 | 59 |
| 285 | -5 | 75 | -18 | 103 | -17 | 102 | -24 | 113 | 316 | -3 | 76 | 6 | 50 | 0 | 62 | 2 | 65 |
| 286 | -3 | 62 | -21 | 107 | -26 | 117 | -28 | 118 | 317 | -6 | 76 | 5 | 53 | 9 | 51 | 14 | 54 |
| 287 | -4 | 58 | -23 | 108 | -27 | 116 | -31 | 120 | 318 | 10 | 58 | 13 | 49 | -1 | 66 | 15 | 44 |
| 288 | -9 | 66 | -26 | 112 | -33 | 122 | -37 | 124 | 319 | -1 | 76 | 4 | 63 | -2 | 71 | 5 | 60 |
| 289 | -1 | 79 | -10 | 96 | -10 | 95 | -10 | 94 | 320 | -1 | 83 | 6 | 64 | -2 | 75 | 2 | 70 |
| 290 | 0 | 71 | -12 | 95 | -14 | 100 | -15 | 102 | 321 | -7 | 99 | -2 | 69 | -1 | 70 | -2 | 76 |
| 291 | 3 | 68 | -5 | 91 | -8 | 95 | -10 | 99 | 322 | -14 | 95 | -2 | 59 | -9 | 72 | -18 | 86 |
| 292 | 10 | 44 | -9 | 93 | -17 | 111 | -13 | 106 | 323 | 2 | 95 | 6 | 70 | 14 | 60 | 12 | 70 |
| 293 | -7 | 62 | -22 | 94 | -28 | 114 | -50 | 127 | 324 | 0 | 76 | 10 | 44 | 16 | 37 | 5 | 64 |
| 294 | 15 | 36 | -5 | 86 | -6 | 89 | -5 | 92 | 325 | -5 | 74 | 9 | 31 | 0 | 47 | -12 | 70 |
| 295 | 14 | 40 | 9 | 67 | -2 | 80 | 17 | 57 | 326 | 0 | 70 | 12 | 43 | 18 | 35 | 11 | 55 |
| 296 | 16 | 27 | -4 | 80 | -4 | 82 | -5 | 86 | 327 | -11 | 75 | 3 | 53 | 11 | 37 | 5 | 56 |
| 297 | 12 | 29 | -10 | 85 | -9 | 85 | -13 | 94 | 328 | 1 | 68 | 14 | 34 | 12 | 41 | 0 | 69 |
| 298 | 1 | 44 | -1 | 70 | -8 | 81 | -12 | 91 | 329 | 0 | 65 | 10 | 38 | 10 | 41 | 2 | 65 |
| 299 | 20 | 36 | 7 | 60 | -1 | 72 | -2 | 77 | 330 | -14 | 73 | -3 | 52 | 2 | 48 | -6 | 74 |
| 300 | 18 | 32 | 9 | 58 | 5 | 64 | 0 | 71 | 331 | 3 | 62 | 13 | 40 | 12 | 41 | 5 | 54 |
| 301 | 5 | 42 | 5 | 61 | 1 | 67 | -1 | 73 | 332 | 4 | 62 | 17 | 32 | 13 | 41 | 7 | 54 |
| 302 | 1 | 48 | 12 | 50 | 9 | 56 | 4 | 64 | 333 | -1 | 68 | 7 | 44 | 0 | 59 | -6 | 76 |
| 303 | 10 | 62 | 15 | 50 | 0 | 69 | -7 | 81 | 334 | -13 | 75 | 7 | 38 | 3 | 50 | -11 | 82 |
| 304 | 17 | 46 | 18 | 49 | 1 | 69 | 5 | 64 | 335 | 11 | 55 | 13 | 50 | 19 | 40 | -2 | 77 |
| 305 | 9 | 64 | 17 | 54 | 7 | 69 | 15 | 57 | 336 | 5 | 64 | 10 | 57 | 3 | 66 | -2 | 77 |
| 306 | -12 | 104 | 10 | 41 | -7 | 69 | 1 | 67 | 337 | 12 | 70 | 26 | 43 | 18 | 50 | 25 | 42 |
| 307 | -11 | 97 | 7 | 46 | -6 | 67 | 0 | 68 | | | | | | | | | |

FIG 18D

| ctxIdx | I and SI slices | | Value of cabac_init_idc | | | | | | ctxIdx | I and SI slices | | Value of cabac_init_idc | | | | | |
|---|---|---|---|---|---|---|---|---|---|---|---|---|---|---|---|---|---|
| | | | 0 | | 1 | | 2 | | | | | 0 | | 1 | | 2 | |
| | m | n | m | n | m | n | m | n | | m | n | m | n | m | n | m | n |
| 338 | 15 | 6 | 14 | 11 | 19 | -6 | 17 | -13 | 369 | 32 | -26 | 31 | -4 | 40 | -37 | 37 | -17 |
| 339 | 6 | 19 | 11 | 14 | 18 | -6 | 16 | -9 | 370 | 37 | -30 | 27 | 6 | 38 | -30 | 32 | 1 |
| 340 | 7 | 16 | 9 | 11 | 14 | 0 | 17 | -12 | 371 | 44 | -32 | 34 | 8 | 46 | -33 | 34 | 15 |
| 341 | 12 | 14 | 18 | 11 | 26 | -12 | 27 | -21 | 372 | 34 | -18 | 30 | 10 | 42 | -30 | 29 | 15 |
| 342 | 18 | 13 | 21 | 9 | 31 | -16 | 37 | -30 | 373 | 34 | -15 | 24 | 22 | 40 | -24 | 24 | 25 |
| 343 | 13 | 11 | 23 | -2 | 33 | -25 | 41 | -40 | 374 | 40 | -15 | 33 | 19 | 49 | -29 | 34 | 22 |
| 344 | 13 | 15 | 32 | -15 | 33 | -22 | 42 | -41 | 375 | 33 | -7 | 22 | 32 | 38 | -12 | 31 | 16 |
| 345 | 15 | 16 | 32 | -15 | 37 | -28 | 48 | -47 | 376 | 35 | -5 | 26 | 31 | 40 | -10 | 35 | 18 |
| 346 | 12 | 23 | 34 | -21 | 39 | -30 | 39 | -32 | 377 | 33 | 0 | 21 | 41 | 38 | -3 | 31 | 28 |
| 347 | 13 | 23 | 39 | -23 | 42 | -30 | 46 | -40 | 378 | 38 | 2 | 26 | 44 | 46 | -5 | 33 | 41 |
| 348 | 15 | 20 | 42 | -33 | 47 | -42 | 52 | -51 | 379 | 33 | 13 | 23 | 47 | 31 | 20 | 36 | 28 |
| 349 | 14 | 26 | 41 | -31 | 45 | -36 | 46 | -41 | 380 | 23 | 35 | 16 | 65 | 29 | 30 | 27 | 47 |
| 350 | 14 | 44 | 46 | -28 | 49 | -34 | 52 | -39 | 381 | 13 | 58 | 14 | 71 | 25 | 44 | 21 | 62 |
| 351 | 17 | 40 | 38 | -12 | 41 | -17 | 43 | -19 | 382 | 29 | -3 | 8 | 60 | 12 | 48 | 18 | 31 |
| 352 | 17 | 47 | 21 | 29 | 32 | 9 | 32 | 11 | 383 | 26 | 0 | 6 | 63 | 11 | 49 | 19 | 26 |
| 353 | 24 | 17 | 45 | -24 | 69 | -71 | 61 | -55 | 384 | 22 | 30 | 17 | 65 | 26 | 45 | 36 | 24 |
| 354 | 21 | 21 | 53 | -45 | 63 | -63 | 56 | -46 | 385 | 31 | -7 | 21 | 24 | 22 | 22 | 24 | 23 |
| 355 | 25 | 22 | 48 | -26 | 66 | -64 | 62 | -50 | 386 | 35 | -15 | 23 | 20 | 23 | 22 | 27 | 16 |
| 356 | 31 | 27 | 65 | -43 | 77 | -74 | 81 | -67 | 387 | 34 | -3 | 26 | 23 | 27 | 21 | 24 | 30 |
| 357 | 22 | 29 | 43 | -19 | 54 | -39 | 45 | -20 | 388 | 34 | 3 | 27 | 32 | 33 | 20 | 31 | 29 |
| 358 | 19 | 35 | 39 | -10 | 52 | -35 | 35 | -2 | 389 | 36 | -1 | 28 | 23 | 26 | 28 | 22 | 41 |
| 359 | 14 | 50 | 30 | 9 | 41 | -10 | 28 | 15 | 390 | 34 | 5 | 28 | 24 | 30 | 24 | 22 | 42 |
| 360 | 10 | 57 | 18 | 26 | 36 | 0 | 34 | 1 | 391 | 32 | 11 | 23 | 40 | 27 | 34 | 16 | 60 |
| 361 | 7 | 63 | 20 | 27 | 40 | -1 | 39 | 1 | 392 | 35 | 5 | 24 | 32 | 18 | 42 | 15 | 52 |
| 362 | -2 | 77 | 0 | 57 | 30 | 14 | 30 | 17 | 393 | 34 | 12 | 28 | 29 | 25 | 39 | 14 | 60 |
| 363 | -4 | 82 | -14 | 82 | 28 | 26 | 20 | 38 | 394 | 39 | 11 | 23 | 42 | 18 | 50 | 3 | 78 |
| 364 | -3 | 94 | -5 | 75 | 23 | 37 | 18 | 45 | 395 | 30 | 29 | 19 | 57 | 12 | 70 | -16 | 123 |
| 365 | 9 | 69 | -19 | 97 | 12 | 55 | 15 | 54 | 396 | 34 | 26 | 22 | 53 | 21 | 54 | 21 | 53 |
| 366 | -12 | 109 | -35 | 125 | 11 | 65 | 0 | 79 | 397 | 29 | 39 | 22 | 61 | 14 | 71 | 22 | 56 |
| 367 | 36 | -35 | 27 | 0 | 37 | -33 | 36 | -16 | 398 | 19 | 66 | 11 | 86 | 11 | 83 | 25 | 61 |
| 368 | 36 | -34 | 28 | 0 | 39 | -36 | 37 | -14 | | | | | | | | | |

ARITHMETIC CODING FOR TRANSFORMING VIDEO AND PICTURE DATA UNITS

BACKGROUND OF THE INVENTION

I. Technical Field of the Invention

The present invention is related to coding a video frame or picture and, in particular, to an arithmetic coding scheme for transform data units or sub-units thereof.

II. Description of the Prior Art

Entropy coders map an input bit stream of binarizations of data values to an output bit stream, the output bit stream being compressed relative to the input bit stream, i.e., consisting of less bits than the input bit stream. This data compression is achieved by exploiting the redundancy in the information contained in the input bit stream.

Entropy coding is used in video coding applications. Natural camera-view video signals show non-stationary statistical behavior. The statistics of these signals largely depend on the video content and the acquisition process. Traditional concepts of video coding that rely on mapping from the video signal to a bit stream of variable length-coded syntax elements exploit some of the non-stationary characteristics but certainly not all of it. Moreover, higher-order statistical dependencies on a syntax element level are mostly neglected in existing video coding schemes. Designing an entropy coding scheme for video coder by taking into consideration these typical observed statistical properties, however, offer significant improvements in coding efficiency.

Entropy coding in today's hybrid block-based video coding standards such as MPEG-2 and MPEG-4 is generally based on fixed tables of variable length codes (VLC). For coding the residual data in these video coding standards, a block of transform coefficient levels is first mapped into a one-dimensional list using an inverse scanning pattern. This list of transform coefficient levels is then coded using a combination of run-length and variable length coding. The set of fixed VLC tables does not allow an adaptation to the actual symbol statistics, which may vary over space and time as well as for different source material and coding conditions. Finally, since there is a fixed assignment of VLC tables and syntax elements, existing inter-symbol redundancies cannot be exploited within these coding schemes.

It is known, that this deficiency of Huffman codes can be resolved by arithmetic codes. In arithmetic codes, each symbol is associated with a respective probability value, the probability values for all symbols defining a probability estimation. A code word is coded in an arithmetic code bit stream by dividing an actual probability interval on the basis of the probability estimation in several sub-intervals, each sub-interval being associated with a possible symbol, and reducing the actual probability interval to the sub-interval associated with the symbol of data value to be coded. The arithmetic code defines the resulting interval limits or some probability value inside the resulting probability interval.

As may be clear from the above, the compression effectiveness of an arithmetic coder strongly depends on the probability estimation as well as the symbols, which the probability estimation is defined on.

A special kind of context-based adaptive binary arithmetic coding, called CABAC, is employed in the H.264/AVC video coding standard. There was an option to use macroblock adaptive frame/field (MBAFF) coding for interlaced video sources. Macroblocks are units into which the pixel samples of a video frame are grouped. The macroblocks, in turn, are grouped into macroblock pairs. Each macroblock pair assumes a certain area of the video frame or picture. Furthermore, several macroblocks are grouped into slices. Slices that are coded in MBAFF coding mode can contain both, macroblocks coded in frame mode and macroblocks coded in field mode. When coded in frame mode, a macroblock pair is spatially sub-divided into a top and a bottom macroblock, the top and the bottom macroblock comprising both pixel samples captured at a first time instant and picture samples captured at the second time instant being different from the first time instant. When coded in field mode, the pixel samples of a macroblock pair are distributed to the top and the bottom macroblock of the macroblock pair in accordance with their capture time.

FIG. 19 shows the CABAC process in the H.264/AVC video coding standard for transform data units. The process starts with the picture of video frame 900 being divided up into frame coded and field coded macroblock pairs. Exemplarily, FIG. 19 shows a field coded macroblock pair 902a and a frame coded macroblock pair 902b. Several processing steps 904 are performed on each macroblock pair 902a and 902b, such as determining the difference of each macroblock to a prediction of the macroblock and performing a discrete cosine transformations on the differences. The result of the processing steps 904 are transform coefficient blocks or 2-dimensional transform coefficient arrays 906a for macroblock pair 902a and transform coefficient arrays 906b for the macroblock pair 902b, more particularly, one transform coefficient array for each sub-array of a macroblock of a macroblock pair.

These 2-dimensional transform coefficient arrays 906a and 906b are pre-coded in a step 908 in order to map the transform coefficients in the arrays 906a and 906b in sequences 910a and 910b of transform data units. The mapping is performed by use of a scanning pattern defining a scanning order among the transform coefficients in a certain array. Now, while the transform coefficient blocks 906b of frame macroblocks 902b are scanned in a zig-zag fashion an alternate scan is used for field macroblocks 902a. The reason is that the pixel samples contained in a field coded macroblock have a different spatial relationship to each other, in particular, a different pixel pitch compared to the pixel samples of frame coded macroblocks.

In particular, the preceding step 908 is performed in three steps: a binary symbol coded_block_flag indicating the presence of significant, i.e. non-zero, transform coefficients is coded. If the coded_block_flag indicates significant coefficients, a significance map specifying the location of significant coefficients is coded. This is done by use of a significant_coeff_flag that indicates as to whether the respective transform coefficient is significant or not. For significant transform coefficients a further flag is determined, i.e. last_significant_coeff_flag. This flag indicates as to whether the respective transform coefficient is the last significant transform coefficient with respect to scanning order. The latter two flags define the significance map. The steps are repeated for consecutive transform coefficients in scanning order until the last significant transform coefficient has been reached. Last but not least, the non-zero levels are coded in reverse scanning order.

FIG. 19 exemplarily shows the transform data units for the first four and three, respectively, scanning positions for the transform coefficient arrays 906a and 906b. Each transform data unit comprises at least the significant_coeff_flag and, in case of a significant transform coefficient, a last_significant_coeff_flag and an indication of the non-zero level. It is noted that the transform data units are illustrated in FIG.

19 as continuous data blocks in a precoded video signal 912 merely for illustration purposes and that in fact, the significance map precedes the non-zero levels of the significant transform coefficients.

The syntax elements, such as the significant_coeff_flags and last_significant_coeff_flags, are then passed to a binary arithmetic coding stage. For both syntax elements, significant_coeff_flag and last_significant_coeff_flag, the context model which specifies the probability estimation to be used in the binary arithmetic coding, is chosen among the same set of context models and merely based on the scanning position within sequences 910a and 910b. This step of choosing the context model is shown at 914. Afterwards, in step 916, the syntax elements are binary arithmetically encoded by use of the context model chosen in step 914.

As turned out from the above discussion, the same set of context models is used for both significance map flags relating to field coded macroblocks and frame coded macroblocks thereby neglecting the fact that different scanning orders or different scanning patterns have been used in order to map the two-dimensional arrays 906a and 906b to sequences 910a and 910b, respectively. Therefore, in case of macroblock adaptive frame/field coding, where both scans can be used within the same slice, the significance indication, i.e., significant_coeff_flag and last_significant_coeff_flag, of transform coefficients related to different frequencies in a transform block 906a and 906b may be coded using the same probability model. As a consequence, the probability model cannot be well adapted to the actual symbol statistic, which are in general different for frame and field macroblocks. In addition, the initialisation tables for the probability models of the syntax elements significant_coeff_flag and last_significant_coeff_flag cannot be suitable for both frame and field macroblocks.

SUMMARY OF THE INVENTION

It is the object of the present invention to provide a video frame or picture coding scheme which enables a higher compression effectiveness.

In accordance with a first aspect of the present invention this object is achieved by a method for encoding a video frame or picture, the method comprising dividing up the video frame or the picture in portions of a first type and portions of a second type, wherein the portions of the first type are associated with a first scanning pattern, and the portions of the second type are associated with a second scanning pattern that is different from the first scanning pattern; transforming data corresponding to a predetermined of the portions of the video frame or picture into a two-dimensional array of transform coefficients, wherein a scanning order is defined among the transform coefficients by the scanning pattern of the predetermined portion, the scanning order assigning each transform coefficient a unique scanning position; preceding a predetermined of the transform coefficients in order to obtain a transform data unit; choosing one of a first and a second set of context models, depending on as to whether the predetermined portion is a portion of a type being associated with the first or the second scanning pattern, the first and the second set being different to each other; assigning one context model of the chosen one of the first and the second set of context models to the transform data unit based on the scanning position assigned to the predetermined transform coefficient, wherein each context model is associated with a different probability estimation; and arithmetically encoding the transform data unit or a sub-unit thereof into a coded bit stream based on the probability estimation with which the assigned context model is associated.

In accordance with a second aspect of the present invention this object is achieved by a method for decoding a transform data unit or a sub-unit thereof from a coded bit stream, the transform data unit being a precoded version of a predetermined transform coefficient of transform coefficients which are the result of a transformation of data corresponding to a predetermined portion of portions of a video frame or picture, the portions being either a portion of a first type being associated with a first scanning pattern or a portion of a second type being associated with a second scanning pattern, the method comprising choosing one of a first and a second set of context models, depending on as to whether the predetermined portion is a portion of a type being associated with the first or the second scanning pattern, the first and the second set being different to each other; assigning one context model of the chosen one of the first and the second set of context models to the transform data unit or the sub-unit thereof based on the scanning position assigned to the predetermined transform coefficient, wherein each context model is associated with a different probability estimation; and arithmetically decoding the transform data unit or the sub-unit thereof from the coded bit stream based on the probability estimation with which the assigned context model is associated.

In accordance with a third aspect of the present invention this object is achieved by an apparatus for encoding a video frame or picture, the method comprising means for dividing up the video frame or the picture in portions of a first type and portions of a second type, wherein the portions of the first type are associated with a first scanning pattern, and the portions of the second type are associated with a second scanning pattern that is different from the first scanning pattern; means for transforming data corresponding to a predetermined of the portions of the video frame or picture into a two-dimensional array of transform coefficients, wherein a scanning order is defined among the transform coefficients by the scanning pattern of the predetermined portion, the scanning order assigning each transform coefficient a unique scanning position; means for preceding a predetermined of the transform coefficients in order to obtain a transform data unit; means for choosing one of a first and a second set of context models, depending on as to whether the predetermined portion is a portion of a type being associated with the first or the second scanning pattern, the first and the second set being different to each other; means for assigning one context model of the chosen one of the first and the second set of context models to the transform data unit based on the scanning position assigned to the predetermined transform coefficient, wherein each context model is associated with a different probability estimation; and means for arithmetically encoding the transform data unit or a sub-unit thereof into a coded bit stream based on the probability estimation with which the assigned context model is associated.

In accordance with a fourth aspect of the present invention this object is achieved by an apparatus for decoding a transform data unit or a sub-unit thereof from a coded bit stream, the transform data unit being a precoded version of a predetermined transform coefficient of transform coefficients which are the result of a transformation of data corresponding to a predetermined portion of portions of a video frame or picture, the portions being either a portion of a first type being associated with a first scanning pattern or a portion of a second type being associated with a second scanning pattern, the method comprising means for choosing one of a first and a second set of context models, depending on as to whether the predetermined portion is a portion of a type being associated with the first or the second scanning pattern, the first and the second set being different to each other; means for assigning one context model of the chosen one of the first and the second set of context models to the transform data unit or the sub-unit thereof based on the scanning position assigned to the predetermined transform coefficient, wherein each context model is associated with a different probability estimation; and means for arithmetically decoding the transform data unit or the sub-unit thereof from the coded bit stream based on the probability estimation with which the assigned context model is associated.

The present invention is based on the finding that the transform data units or sub-units thereof obtained from a video frame or picture may be coded in a more compressive way, when different sets of context models are used for coding transform data units or sub-units thereof related to portions of the video frame or picture associated with a first scanning pattern as compared to transform data units or sub-units thereof related to portions of the video frame or picture associated with a different scanning pattern. By this measure, the context models can be adapted more precisely to the actual symbol statistics, which may be different between transform data units belonging to the same scanning position due to the different scanning patterns. Since the actual probability distribution can be approximated more precisely, the compression ratio of the coded bit stream may be enhanced. Furthermore, since different context models are used for transform data units related to picture portions associated with different scanning patterns, the transform data units contributing to the update of a probability estimation of that context model show a more uniform actual probability distribution so that the updated probability estimation does more precisely approximate the actual probability distribution. Similarly, providing different context model sets enables initialising the probability estimation of the context models more precisely to the actual probability distribution. Thus, compression ratio of the coded bit stream may further be enhanced.

SHORT DESCRIPTION OF THE DRAWINGS

Preferred embodiments of the present invention are described in more detail below with respect to the figures.

FIG. 3 shows a schematic diagram illustrating the spatial subdivision of a picture or video frame into macroblock pairs.

FIG. 4a shows a schematic diagram illustrating the frame mode.

FIG. 4b shows a schematic diagram illustrating the field mode.

FIG. 5 shows a schematic flow diagram illustrating the encoding of a video frame or picture in accordance with an embodiment of the present invention.

Figures 6, 7:
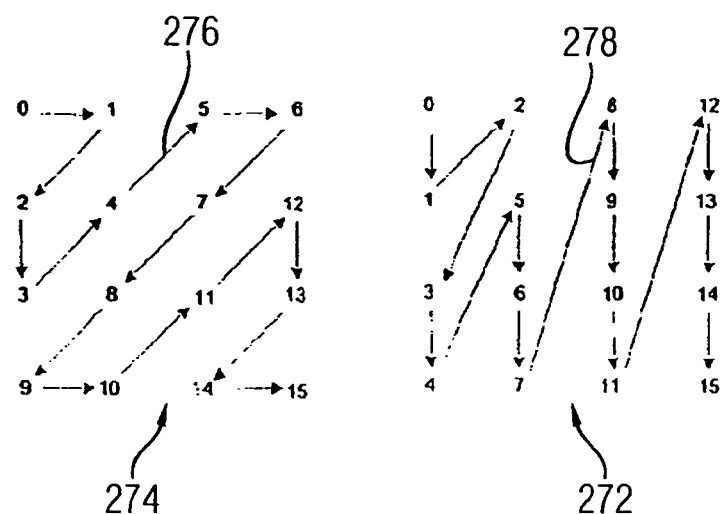

FIG. 6 illustrating the different scanning patterns used for field coded macroblocks and frame coded macro-blocks.

FIG. 7 shows a table illustrating a significance map as obtained from the exemplarily chosen transform coefficient levels in accordance with an embodiment of the present invention.

Figure 8:
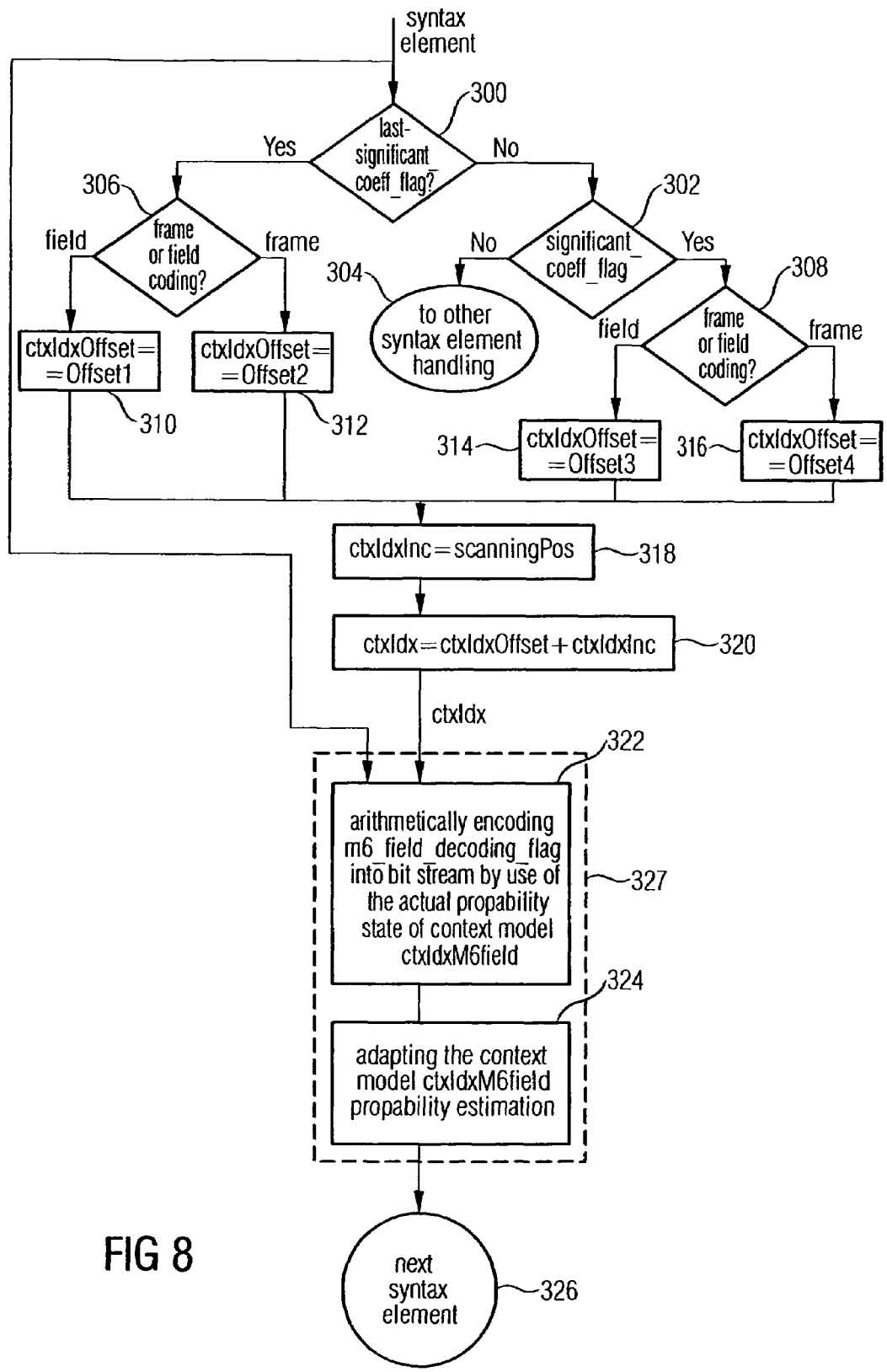

FIG. 8 shows a flow diagram illustrating the encoding of the syntax elements last_significant_coeff_flag and significant_coeff_flag in accordance with an embodiment of the present invention.

Figure 9:
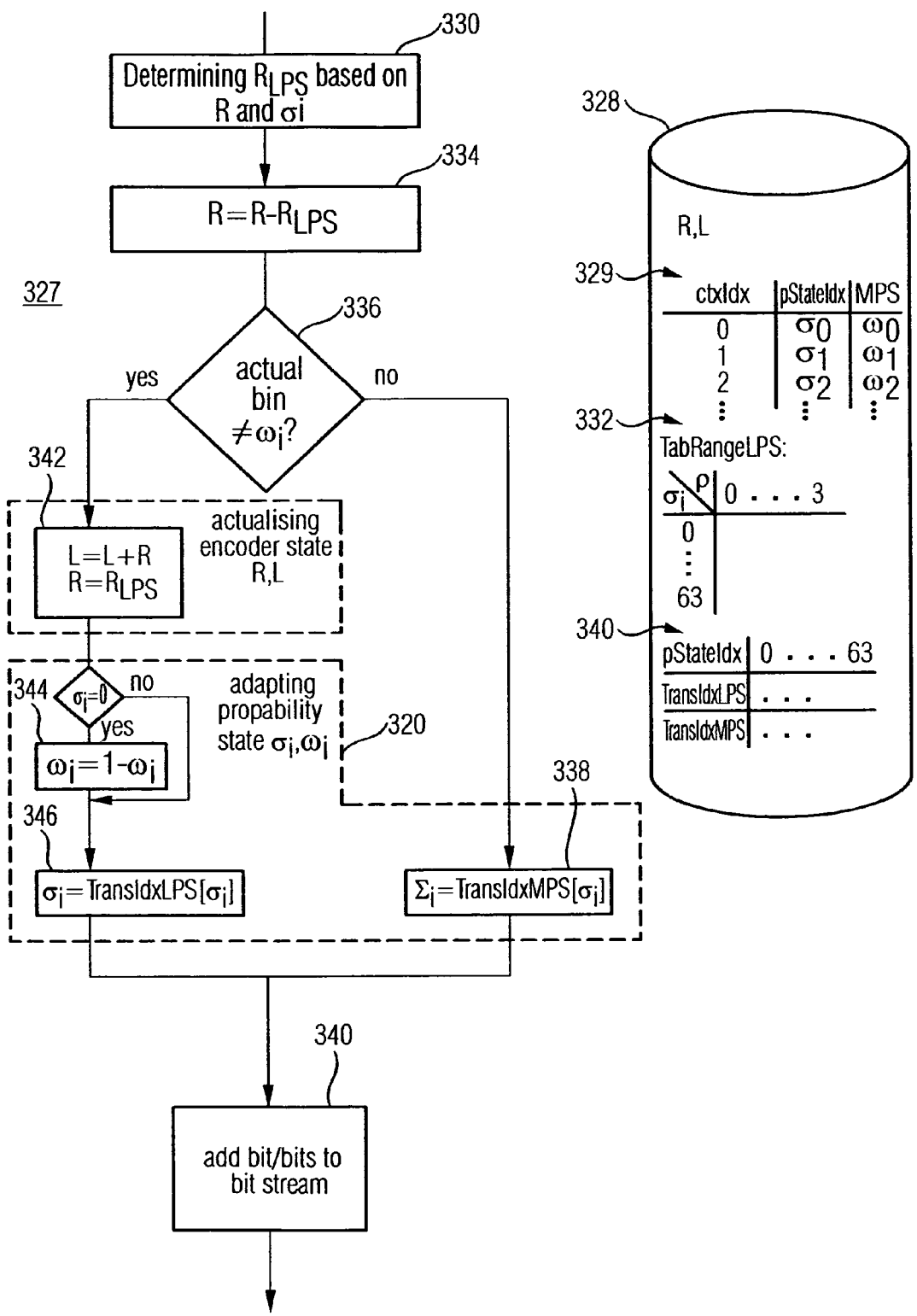

FIG. 9 shows a flow diagram illustrating the binary arithmetic coding of the syntax elements significant_coeff_flag and last_significant_coeff_flag based on the context model to which it is assigned in accordance with an embodiment of the present invention.

Figure 10:
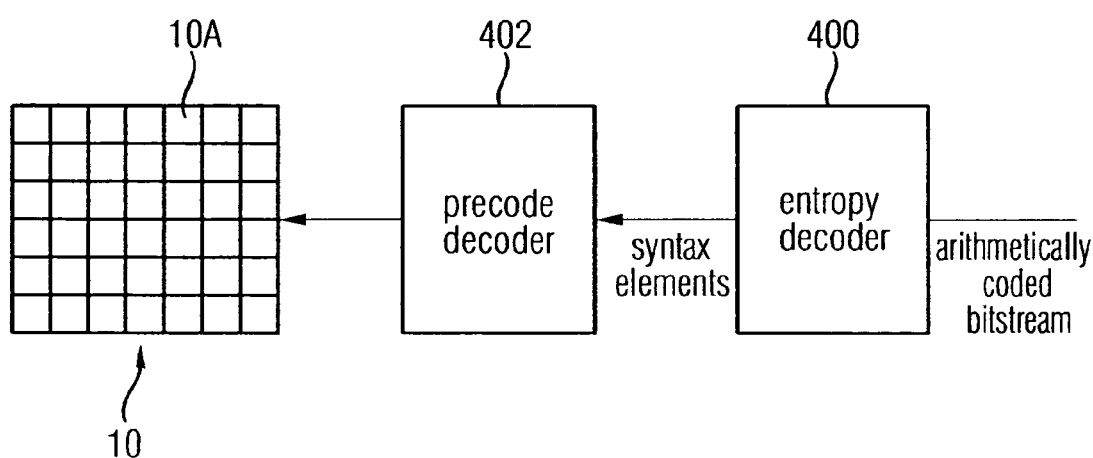

FIG. 10 shows a high-level block diagram of a decoding environment in which the present invention may be employed.

FIG. 11 shows a pseudo C-code illustrating the parsing process on decoder side in accordance with an embodiment of the present invention.

Figure 12:
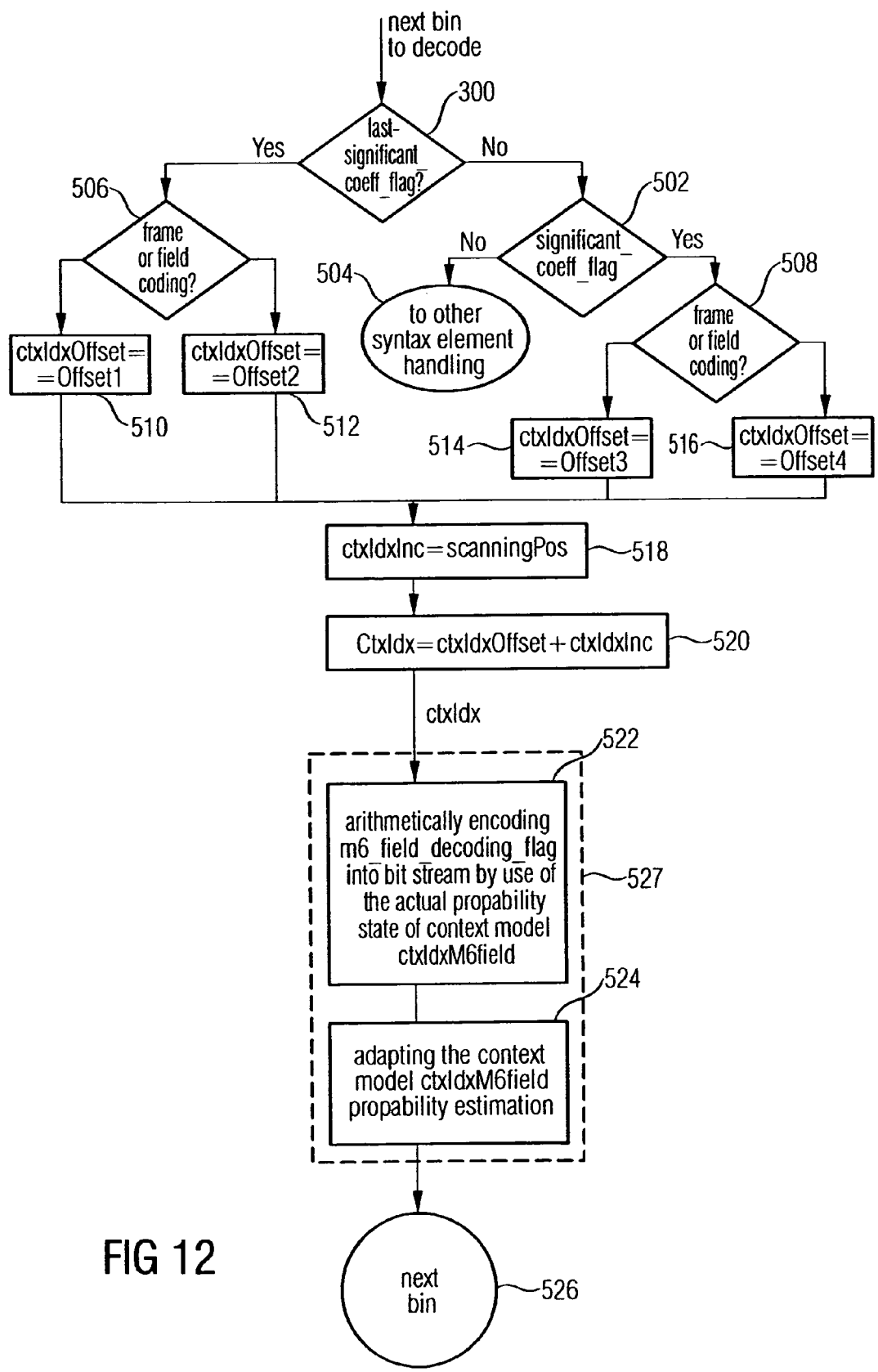

FIG. 12 shows a flow diagram illustrating the decoding of the syntax elements significant_coeff_flag and last_significant_coeff_flag from the coded bit stream as derived by the encoding scheme of FIG. 8, in accordance with an embodiment of the present invention.

Figure 13:
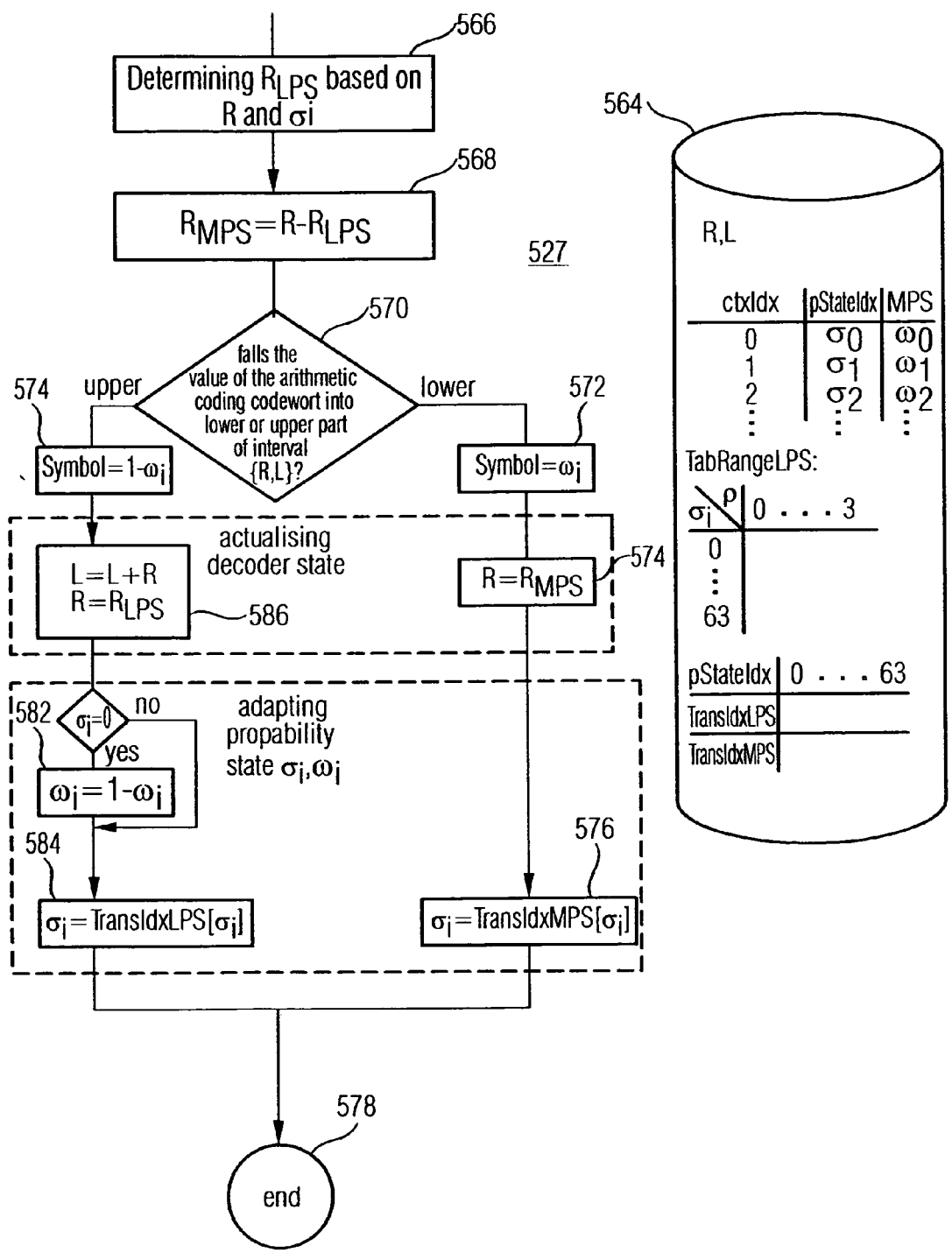

FIG. 13 shows a flow diagram illustrating the arithmetical decoding process and the decoding process of FIG. 12 in accordance with an embodiment of the present invention.

Figure 14:
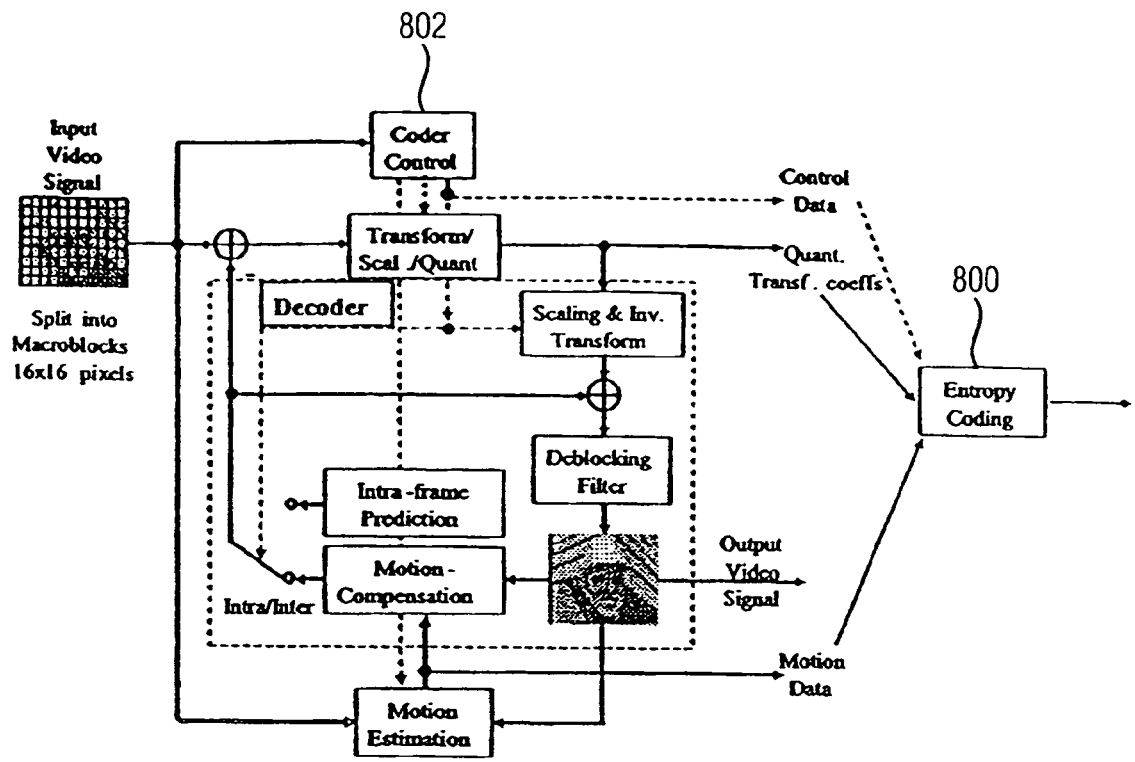

FIG. 14 shows a basic coding structure for the emerging H.264/AVC video encoder for a macroblock.

Figure 15:
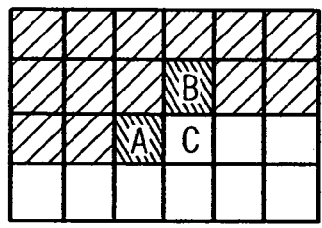

FIG. 15 illustrates a context template consisting of two neighboring syntax elements A and B to the left and on the top of the current syntax element C.

Figure 16:
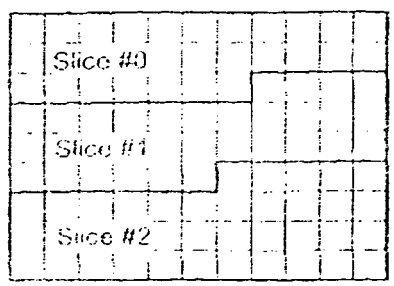

FIG. 16 shows an illustration of the subdivision of a picture into slices.

Figure 17:
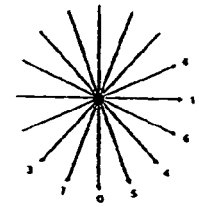

FIG. 17 shows, to the left, intra_4×4 prediction conducted for samples a-p of a block using samples A_Q, and to the right, "prediction directions for intra_4×4 prediction.

FIG. 18a to 18d shows tables of initialization values for initializing the context models in accordance with an embodiment of the present invention.

Figure 19:
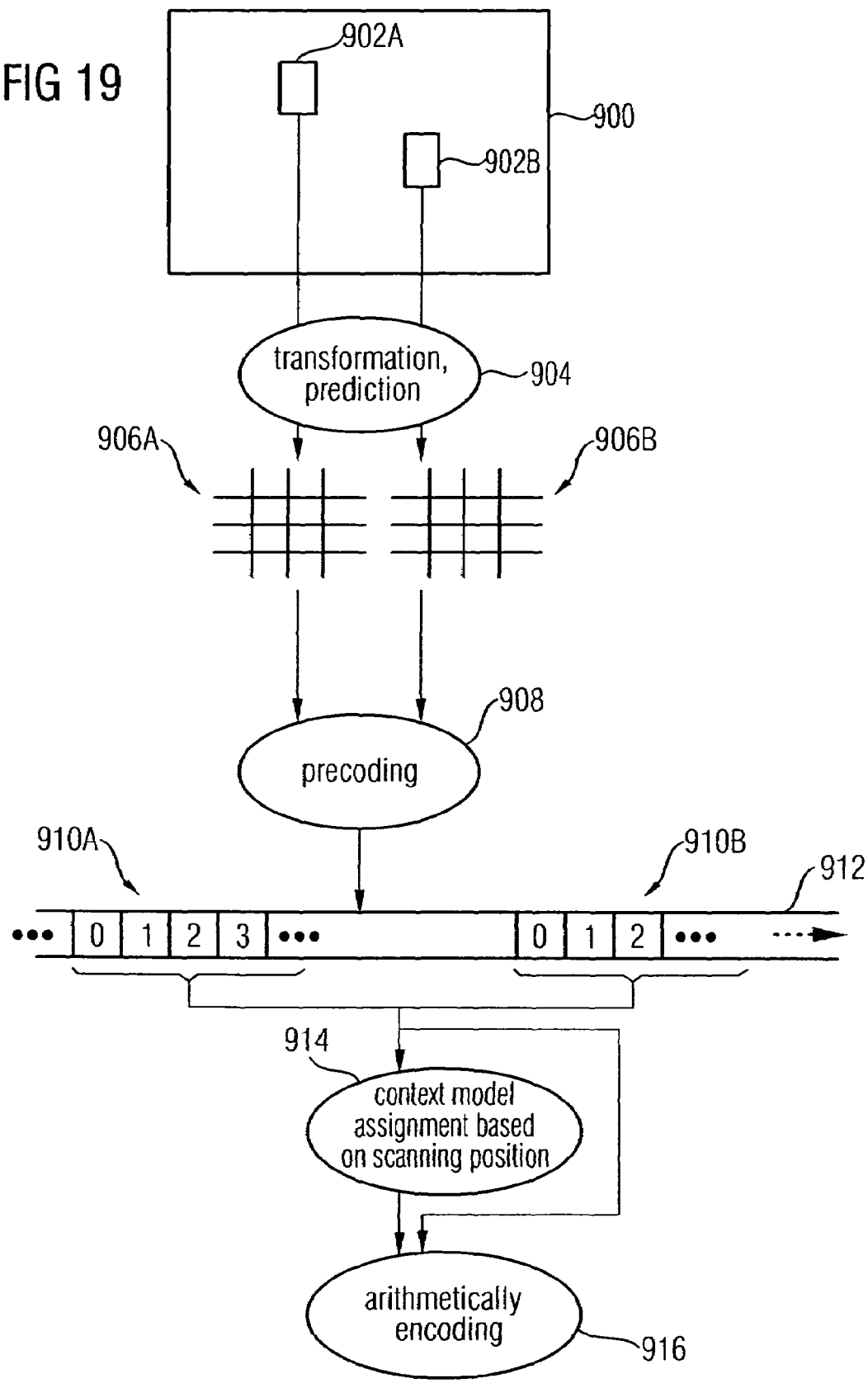

FIG. 19 shows a schematic flow diagram of a conventional process of encoding a video frame or picture.

DETAILED DESCRIPTION OF THE PRESENT INVENTION

Figure 1:
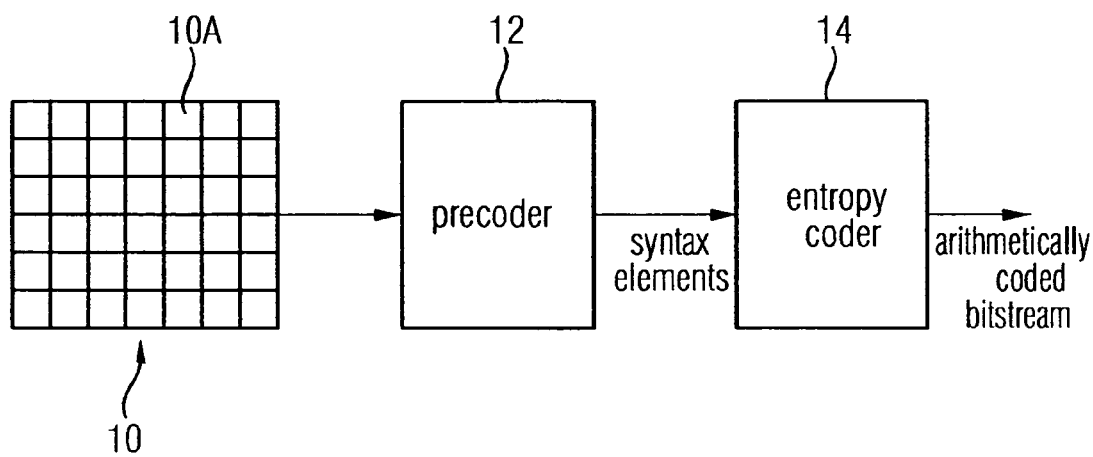
FIG. 1 shows a high-level block diagram of a coding environment in which the present invention may be employed.

FIG. 1 shows a general view of a video encoder environment to which the present invention could be applied. A picture of video frame 10 is fed to a video precoder 12. The video precoder treats the picture 10 in units of so-called macroblocks 10a. Each macroblock contains several picture samples of picture 10. On each macroblock a transformation into transformation coefficients is performed followed by a quantization into transform coefficient levels. Moreover, intra-frame prediction or motion compensation is used in order not to perform the afore mentioned steps directly on the pixel data but on the differences of same to predicted pixel values, thereby achieving small values which are more easily compressed.

Precoder 12 outputs the result, i.e., the precoded video signal. All residual data elements in the precoded video signal, which are related to the coding of transform coefficients, such as the transform coefficient levels or a significance map indicating transform coefficient levels skipped, are called residual data syntax elements. Besides these residual data syntax elements, the precoded video signal output by precoder 12 contains control information syntax elements containing control information as to how each macroblock has been coded and has to be decoded, respectively.

In other words, the syntax elements are dividable into two categories. The first category, the control information syntax elements, contains the elements related to a macroblock type, sub-macroblock type, and information on prediction modes both of a spatial and of temporal types as well as slice-based and macroblock-based control information, for example. In the second category, all residual data elements such as a significance map indicating the locations of all significant coefficients inside a block of quantized transform coefficients, and the values of the significant coefficients, which are indicated in units of levels corresponding to the quantizations steps, are combined, i.e., the residual data syntax elements.

The macroblocks into which the picture 10 is partitioned are grouped into several slices. In other words, the picture 10 is subdivided into slices. An example for such a subdivision is shown in FIG. 16, in which each block or rectangle represents a macroblock. For each slice, a number of syntax elements are generated by precoder 12, which form a coded version of the macro blocks of the respective slice.

Figure 2:
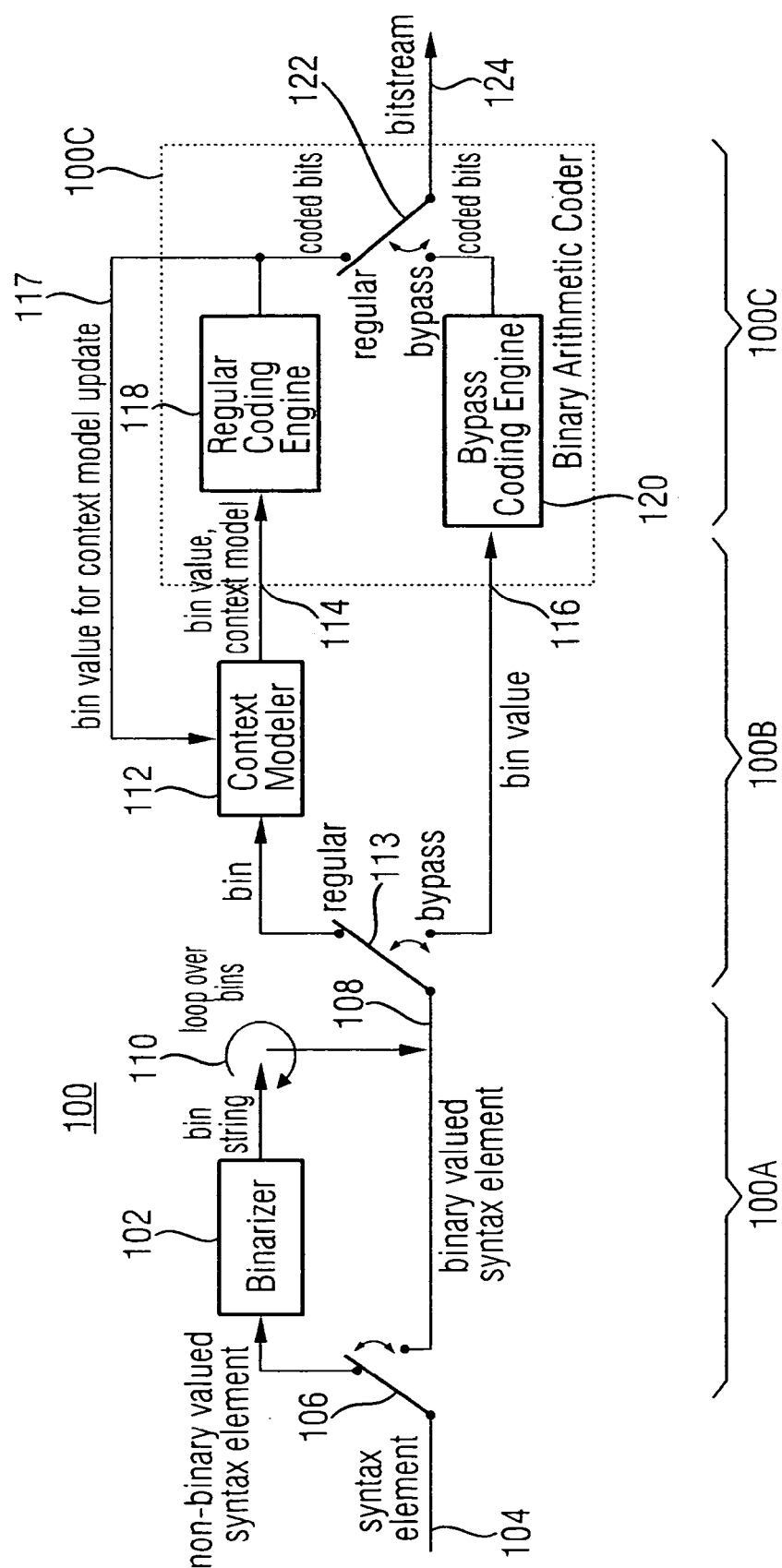
FIG. 2 shows a block diagram of the entropy coding part of the coding environment of FIG. 1, in accordance with an embodiment of the present invention.

The precoder 12 transfers the syntax elements to a final coder stage 14, which is an entropy coder and explained in more detail with respect to FIG. 2. The final coder stage 14 generates an arithmetic codeword for each slice. When generating the arithmetic codeword for a slice, the final coding stage 14 exploits the fact that each syntax element is a data value having a certain meaning in the video signal bit stream that is passed to the entropy coder 14. The entropy coder 14 outputs a final compressed arithmetic code video bit stream comprising arithmetic codewords for the slices of picture 10.

FIG. 2 shows the arrangement for coding the syntax elements into the final arithmetic code bit stream, the arrangement generally indicated by reference number 100. The coding arrangement 100 is divided into three stages, 100a, 100b, and 100c.

The first stage 100a is the binarization stage and comprises a binarizer 102. An input of the binarizer 102 is connected to an input 104 of stage 100a via a switch 106. At the same time, input 104 forms the input of coding arrangement 100. The output of binarizer 102 is connected to an output 108 of stage 100a, which, at the same time, forms the input of stage 100b. Switch 106 is able to pass syntax elements arriving at input 104 to either binarizer 102 or binarization stage output 108, thereby bypassing binarizer 102.

The function of switch 106 is to directly pass the actual syntax element at input 104 to the binarization stage output 108 if the syntax element is already in a wanted binarized form. Examples for syntax elements that are not in the correct binarization form, called non-binary valued syntax elements, are motion vector differences and transform coefficient levels. An example for a syntax element that has not to be binarized since it is already a binary value are the MBAFF (MBAFF=Macroblock Adaptive Frame/Field) Coding mode flag, the significant_coeff_flag und the last_significant_coeff_flag to be described later in more detail.

The non-binary valued syntax elements are passed via switch 106 to binarizer 102. Binarizer 102 maps the non-binary valued syntax elements to a codeword, or a so-called bin string, so that they are now in a binary form. The term "bin" means the binary decision that have to be made at a node of a coding tree defining the binarization mapping of a non-binary value to a bit string or codeword, when transitioning from the route node of the coding tree to the leaf of the coding tree corresponding to the non-binary value of the non-binary syntax element to be binarized. Thus, a bin string is a sequence of bins or binary decisions and corresponds to a codeword having the same number of bits, each bit being the result of a binary decision.

The bin strings output by binarizer 102 may not be passed directly to binarization stage output 108 but controllably passed to output 108 by a bin loop over means 110 arranged between the output of binarizer 102 and output 108 in order to merge the bin strings output by binarizer 102 and the already binary valued syntax elements bypassing binarizer 102 to a single bit stream at binarization stage output 108.

Thus, the binarization stage 108 is for transferring the syntax elements into a suitable binarized representation. The binarization procedure in binarizer 102 preferably yields a binarized representation which is adapted to the probability distribution of the syntax elements so as to enable very efficient binary arithmetic coding.

Stage 100b is a context modelling stage and comprises a context modeller 112 as well as a switch 113. The context modeller 112 comprises an input, an output, and an optional feedback input. The input of context modeller 112 is connected to the binarization stage output 108 via switch 113. The output of context modeller 112 is connected to a regular coding input terminal 114 of stage 100c. The function of switch 113 is to pass the bits or bins of the bin sequence at binarization stage output 108 to either the context modeller 112 or to a bypass coding input terminal 116 of stage 100c, thereby bypassing context modeller 112.

The aim of switch 113 is to ease the subsequent binary arithmetic coding performed in stage 100c. To be more precise, some of the bins in the bin string output by binarizer 102 show heuristically nearly an equi-probable distribution. This means, the corresponding bits are, with a probability of nearly 50%, 1 and, with a probability of nearly 50%, 0, or, in other words, the bits corresponding to this bin in a bin string have a 50/50 chance to be 1 or 0. These bins are fed to the bypass-coding input terminal 116 and are binary arithmetically coded by use of an equi-probable probability estimation, which is constant and, therefore, needs no adaption or updating overhead. For all other bins, it has been heuristically determined that the probability distribution of these bins depends on other bins as output by stage 100a so that it is worthwhile to adapt or update the probability estimation used for binary arithmetically coding of the respective bin as it will be described in more detail below exemplarily with respect to the syntax element mb_field_decoding_flag. The latter bins are thus fed by switch 113 to the input terminal of context modeller 112.

Context modeller 112 manages a set of context models. For each context model, the context modeller 112 has stored an actual bit or bin value probability distribution estimation. For each bin that arrives at the input of context modeller 112, the context modeller 112 selects one of the sets of context models. In other words, the context modeller 112 assigns the bin to one of the set of context models. The assignment of bins to a context model is such that the actual probability distribution of bins belonging to the same context model show the same or likewise behaviour so that the actual bit or bin value probability distribution estimation stored in the context modeller 112 for a certain context model is a good approximation of the actual probability distribution for all bins that are assigned to this context model.

When having assigned the context model to an incoming bin the context modeller 112 passes the bin further to arithmetical coding stage 100c together with the probability distribution estimation of the context model, which the bin is assigned to. By this measure, the context modeller 112 drives the arithmetical coding stage 100c to generate a sequence of bits as a coded representation of the bins input in context modeller 112 by switch 113 according to the switched bit value probability distribution estimations as indicated by the context modeller 112.

Moreover, the context modeller 112 continuously updates the probability distribution estimations for each context model in order to adapt the probability distribution estimation for each context model to the property or attributes of the picture or video frame from which the syntax elements and bins have been derived. The estimation adaptation or estimation update is based on past or prior bits or bin values which the context modeller 112 receives at the feedback input over a feedback line 117 from stage 100c or may temporarily store. Thus, in other words, the context modeller 112 updates the probability estimations in response to the bin values passed to arithmetical coding stage 100c. To be more precise, the context modeller 112 uses a bin value assigned to a certain context model merely for adaptation or update of the probability estimation that is associated with the context model of this bin value.

Some of the syntax elements, when the same bin or same syntax element occurs several times in the bins passed from stage 100a may be assigned to different of the context models each time they occur, depending on previously incoming or previously arithmetically coded bins, and/or depending on other circumstances, as is described in more detail below with respect to significant_coeff_flag and last_significant_coeff_flag.

It is clear from the above, that the probability estimation used for binary arithmetically coding determines the code and its efficiency in the first place, and that it is of paramount importance to have an adequate model that exploits the statistical dependencies of the syntax elements and bins to a large degree so that the probability estimation is always approximating very effectively the actual probability distribution during encoding.

The third stage 100c of coding arrangement 100 is the arithmetic coding stage. It comprises a regular coding engine 118, a bypass-coding engine 120, and a switch 122. The regular coding engine 118 comprises an input and an output terminal. The input terminal of regular coding engine 118 is connected to the regular coding input terminal 114. The regular coding engine 118 binary arithmetically codes the bin values passed from context modeler 112 by use of the context model also passed from context modeler 112 and outputs coded bits. Further, the regular coding engine 118 passes bin values for context model updates to the feedback input of context modeler 112 over feedback line 117.

The bypass-coding engine 112 has also an input and an output terminal, the input terminal being connected to the bypass coding input terminal 116. The bypass-coding engine 120 is for binary arithmetically coding the bin values passed directly from binarization stage output 108 via switch 113 by use of a static predetermined probability distribution estimation and also outputs coded bits.

The coded bits output from regular coding engine 118 and bypass coding engine 120 are merged to a single bit stream at an output 124 of coding arrangement 100 by switch 122, the bit stream representing a binary arithmetic coded bit stream of the syntax elements as input in input terminal 104. Thus, regular coding engine 118 and bypass coding 120 cooperate in order to bit wise perform arithmetical coding based on either an adaptive or a static probability distribution model.

After having described with respect to FIGS. 1 and 2 rather generally the operation of coding arrangement 100, in the following its functioning is described in more detail with respect to the handling of the syntax elements or bins significant_coeff_flag and last_significant_coeff_flag in accordance with embodiments of the present invention, the handling depending on the scanning pattern used for mapping transform coefficients into a sequence of transform coefficients. In order to do so, firstly, with regard to FIGS. 3 to 4b, the reason for different scanning patterns is illustrated.

FIG. 3 shows a picture or decoded video frame 10. The video frame 10 is spatially partitioned into macroblock pairs 10b. The macroblock pairs are arranged in an array of rows 200 and columns 202. Each macroblock pair consists of two macroblocks 10a.

In order to be able to address each macroblock 10a, a sequence is defined with respect to macroblocks 10a. In order to do so, in each macroblock pair, one macroblock is designated the top macroblock whereas the other macroblock in the macroblock pair is designated the bottom macroblock, the meaning of top and bottom macroblock depending on the mode by which a macroblock pair is coded by precoder 12 (FIG. 1) as will be described with respect to FIGS. 4a and 4b. Thus, each macroblock pair row 200 consists of two macroblock rows, i.e., an top macroblock row 200a consisting of the top macroblocks in the macroblock pairs of the macroblock pair line 200 and a bottom macroblock row 200b comprising the bottom macroblocks of the macroblock pairs.

In accordance with the present example, the top macroblock of the top left macroblock pair resides at address zero. The next address, i.e. address 1, is assigned to the bottom macroblock of the top left macroblock pair. The addresses of the top macroblocks of the macroblock pairs in the same, i.e., top macroblock row 200a, are 2, 4, . . . , 2i-2, with the addresses rising from left to right, and with i expressing the picture width in units of macroblocks or macroblock pairs. The addresses 1, 3, . . . , 2i-1 are assigned to the bottom macroblocks of the macroblock pairs in the top macroblock pair row 200, the addresses rising from left to right. The next 2i-addresses from 2i to 4i-1 are assigned to the macroblocks of the macroblock pairs in the next macroblock pair row from the top and so on, as illustrated in FIG. 3 by the numbers written into the boxes representing the macroblocks 10a and by the arched rows.

It is emphasized that FIG. 3 does show the spatial subdivision of picture 10 in units of macroblock pairs rather than in macroblocks. Each macroblock pair 10b represents a spatial rectangular region of the pictures. All picture samples or pixels (not shown) of picture 10 lying in the spatial rectangular region of a specific macroblock pair 10b belong to this macroblock pair. If a specific pixel or picture sample belongs to the top or the bottom macroblock of a macroblock pair depends on the mode by which precoder 12 has coded the macroblocks in that macroblock pair as it is described in more detail below.

FIG. 4a shows on the left hand side the arrangement of pixels or picture samples belonging to a macroblock pair 10b. As can be seen, the pixels are arranged in an array of rows and columns. Each pixel shown is indicated by a number in order to ease the following description of FIG. 4a. As can be seen in FIG. 4a, some of the pixels are marked by an "x" while the others are marked "_". All pixels marked with "x" belong to a first field of the picture while the other pixels marked with "_" belong to a second field of the picture. Pixels belonging to the same field are arranged in alternate rows of the picture. The picture or video frame can be considered to contain two interleaved fields, a top and a bottom field. The top field comprises the pixels marked with "_" and contains even-numbered rows 2n+2, 2n+4, 2n+6, . . . with 2n being the number of rows of one picture or video frame and n being an integer greater than or equal to 0. The bottom field contains the odd-numbered rows starting with the second line of the frame.

It is assumed that the video frame to which macroblock pair 10b belongs, is an interlaced frame where the two fields were captured at different time instants, for example the top field before the bottom field. It is now that the pixels or picture samples of a macroblock pair are differently assigned to the top or bottom macroblock of the macroblock pair, depending on the mode by which the respective macroblock pair is precoded by precoder 12 (FIG. 1). The reason for this being the following.

As described above with respect to FIG. 1, the picture samples of a macroblock, which may be luminance or luma and chrominance or chroma samples, may be either spatially or temporarily predicted by precoder 12, and the resulting prediction residual is encoded using transform coding in order to yield the residual data syntax elements. It is now that in interlaced frames (and it is assumed that the present video frame is an interlaced frame), with regions of moving objects or camera motion, two adjacent rows of pixels tend to show a reduced degree of statistical dependency when compared to progressive video frames in which both fields are captured at the same time instant. Thus, in cases of such moving objects or camera motion, the pre-coding performed by precoder 12 which, as stated above, operates on macroblocks, may achieve merely a reduced compression efficiency when a macroblock pair is spatially sub-divided into a top macroblock representing the top half region of the macroblock pair and a bottom macroblock representing the bottom half region of the macroblock pair, since in this case, both macroblocks, the top and the bottom macroblock, comprise both top field and bottom field pixels. In this case, it may be more efficient for precoder 12 to code each field separately, i.e., to assign top field pixels to the top macroblock and bottom field pixels to the bottom field macroblock.

In order to illustrate as to how the pixels of a macroblock pair are assigned to the top and bottom macroblock of the, FIGS. 4a and 4b show on the right hand side the resulting top and bottom macroblock in accordance with the frame and field mode, respectively.

FIG. 4a represents the frame mode, i.e., where each macroblock pair is spatially subdivided in a top and a bottom half macroblock. FIG. 4a shows at 250 the top macroblock and at 252 the bottom macroblock as defined when they are coded in the frame mode, the frame mode being represented by double-headed arrow 254. As can be seen, the top macroblock 250 comprises one half of the pixel samples of the macroblock pair 10b while the other picture samples are assigned to the bottom macroblock 252. To be more specific, the picture samples of the top half rows numbered 2n+1 to 2n+6 belong to the top macroblock 250, whereas the picture samples 91 to 96, 101 to 106, 111 to 116 of the bottom half comprising rows 2n+7 to 2n+12 of the macroblock pair 10b belong to the bottom macroblock 252. Thus, when coded in frame mode, both macroblocks 250 and 252 comprise both, picture elements of the first field marked with "x" and captured at a first time instant and picture samples of the second field marked with "_" and captured at a second, different time instant.

The assignment of pixels as they are output by a camera or the like, to top or bottom macroblocks is slightly different in field mode. When coded in field mode, as is indicated by double headed arrow 256 in FIG. 4b, the top macroblock 252 of the macroblock pair 10b contains all picture samples of the top field, marked with "x", while the bottom macroblock 254 comprises all picture samples of the bottom field, marked with "_". Thus, when coded in accordance with field mode 256, each macroblock in a macroblock pair does merely contain either picture samples of the top field or picture samples of the bottom field rather than a mix of picture samples of the top and bottom field.

Now, after having described the spatial sub-division of a picture into macroblock pairs and the assignment of picture samples in a macroblock pair to either the top or the bottom macroblock of the macroblock pair, the assignment depending on the mode by which the macroblock pair or the macroblocks of the macroblock pair are coded by precoder 12, reference is again made to FIG. 1 in order to explain the function and meaning of the syntax element mb_field_decoding_flag contained in the precoded video signal output by precoder 12, and, concurrently, in order to explain the advantages of MBAFF coded frames over just field or frame coded frames.

When the precoder 12 receives a video signal representing an interlaced video frame, precoder 12 is free to make the following decisions when coding the video frame 10:
1. It can combine the two fields together to code them as one single coded frame, so that each macroblock pair and each macroblock would be coded in frame mode.
2. Alternatively, it could combine the two fields and code them as separate coded fields, so that each macroblock pair and each macroblock would be coded in field mode.
3. As a last option, it could combine the two fields together and compress them as a single frame, but when coding the frame it splits the macroblock pairs into either pairs of two field macroblocks or pairs of two frame macroblocks before coding them.

The choice between the three options can be made adaptively for each frame in a sequence. The choice between the first two options is referred to as picture adaptive frame/field (PAFF) coding. When a frame is coded as two fields, each field is partitioned into macroblocks and is coded in a manner very similar to a frame.

If a frame consists of mixed regions where some regions are moving and others are not, it is typically more efficient to code the non-moving regions in frame mode and the moving regions in the field mode. Therefore, the frames/field encoding decision can be made independently for each vertical pair of macroblocks in a frame. This is the third coding option of the above-listed options. This coding option is referred to as macroblock adaptive frame/field (MBAFF) coding. It is assumed in the following that precoder 12 decides to use just this option. As described above, MBAFF coding allows the precoder to better adapt the coding mode type (filed or frame mode) to the respective areas of scenes. For example, precoder 12 codes macroblock pairs located at stationary areas of a video scene in frame mode, while coding macroblock pairs lying in areas of a scene showing fast movements in field mode.

As mentioned above, for a macroblock pair that is coded in frame mode, each macroblock contains frame lines. For a macroblock pair that is coded in field mode, the top macroblock contains top field lines and the bottom macroblock contains bottom field lines. The frame/field decision for each macroblock pair is made at the macroblock pair level by precoder 12, i.e. if the top macroblock is field coded same applies for the bottom macroblock within same macroblock pair. By this measure, the basic macroblock processing structure is kept intact, and motion compensation areas are permitted to be as large as the size of a macroblock.

Each macroblock of a field macroblock pair is processed very similarly to a macroblock within a field in PAFF coding. However, since a mixture of field and frame macroblock pairs may occur within an MBAFF frame, some stages of the pre-coding procedure in precoder 12, such as the prediction of motion vectors, the prediction of intra prediction modes, intra frame sample prediction, deblocking filtering and context modelling in entropy coding and the zig-zag scanning of transform coefficients are modified when compared to the PAFF coding in order to account for this mixture.

To summarize, the pre-coded video signal output by precoder 12 depends on the type of coding precoder 12 has decided to use. In case of MBAFF coding, as it is assumed herein, the pre-coded video signal contains a flag mb_field_decoding_flag for each non-skipped macroblock pair. The flag mb_field_decoding_flag indicates for each macroblock pair it belongs to whether the corresponding macroblocks are coded in frame or field coding mode. On decoder side, this flag is necessary in order to correctly decode the precoded video signal. In case, the macroblocks of a macroblock pair are coded in frame mode, the flag mb_field_decoding_flag is zero, whereas the flag is one in the other case.

After having described the macroblock adaptive frame/field coding, the general handling of frame and field macroblocks during the coding scheme in accordance with an embodiment of the present invention is described with respect to FIG. 5. FIG. 5 shows the steps of encoding frame and field macroblocks as they are performed by precoder 12 and entropy coder 14 of FIG. 1.

FIG. 5 shows the process of encoding the video frame or picture 10 which has already been divided up into macroblock pairs 10b1 and 10b2 as described with respect to FIG. 3. In FIG. 5 exemplarily merely two macroblock pairs 10b1 and 10b2 are shown. It is assumed that macroblock pair 10b1 is field coded while macroblock pair 10b2 is frame coded. Pixel samples belonging to the macroblock pairs 10b1 and 10b2 are passed to precoder 12 where they are processed in step 270. Step 270 comprises subtracting from the picture samples of the macroblock pairs 10b1 and 10b2 predicted pixel samples and transformation the differences from a spatial domain into a spectrum domain. The results of step 220 are several two-dimensional arrays of transform coefficients for each macroblock pair 10b1 and 10b2, each two-dimensional array of transformation coefficients belonging to a sub-part of a macroblock of the macroblock pairs 10b1 and 10b2, such as a sub-part of 4×4 pixel samples or pixel samples differences. FIG. 5 exemplarily shows one such two-dimensional array of transform coefficients as derived from macroblock 10b1 indicated 272 and another two-dimensional array of transform coefficients 274 as derived from macroblock 10b2. For example, the arrays 272 and 274 are 4×4 arrays. They may be obtained by a DCT applied to a 4×4 block of prediction residuals on one of the macroblocks of the macroblock pairs 10b1 and 10b2. For example, the macroblocks are 16×16 samples big. In this case, 16 4×4 blocks of predictional residuals would be transformed into 16 4×4 transformation coefficient arrays for each macroblock. The DCT may be a 4×4 discrete cosine transform or a separable integer transform with similar properties. Inverse-transform mismatches on decoder side may be avoided by defining the transformation matrix such that the inverse transform is defined by exact integer operations.

Now, in the following it is assumed that the 4×4 block of pixel samples resulting in the array 272 of transform coefficients corresponds to the block of pixels 1 to 4, 21 to 24, 41 to 44 and 61 to 64 in the macroblock 252 as shown in FIG. 4b, and that the 4×4 block of pixel samples which array 274 is related to comprises the pixel samples 1 to 4, 11 to 14, 21 to 24 and 31 to 34 of macroblock 250 as shown in FIG. 4a.

As can be seen, the spatial relationship between the pixels in the 4×4 blocks to which the transformation of step 270 is applied is different in field macroblocks and frame macroblocks. In particular, the pixel pitch along the columns is doubled in case of frame macroblocks compared to field macroblocks. Therefore, two transform coefficients assuming the same array position in arrays 272 and 274 relate to different frequencies. Due to this, as mentioned above, different scanning patterns are used in order to define a scanning order among the transform coefficients in arrays 272 and 274. The reason for this is that transform coefficients of lower frequencies are more likely to be zero. Thus, different scanning orders are used in order to 'sort' the transform coefficients in accordance with their frequency they relate to.

FIG. 6 shows an example for the scanning patterns used for frame and field macroblocks. At 274, a two-dimensional array of transform coefficients is obtained from a frame macroblock as illustrated. At each array position a number from 0 to 15 is written, the number indicating the scanning position of the respective transform coefficient. The arrows 276 represent the scanning pattern. As can be seen, the scanning pattern 276 used to define a scanning order among the transform coefficients related to a frame coded macroblock are scanned in a zig-zag scanning starting at one corner of the array 274 and running diagonally to the corner arranged diametrically opposite to the starting corner. It is assumed in FIG. 6 that the transform coefficient in the upper left corner of array 274 having scanning position 0 represents the DC component in column and row direction while the transform coefficient having scanning position 15 arranged diametrically opposite thereto represents the highest frequency part in column and row direction.

At the right side of FIG. 6, the scanning pattern for transform coefficient arrays 272 related to field macroblocks as illustrated. Again, each array position of the 4×4 transformation coefficient array 272 is designated by its scanning position number. The scanning pattern in case of field macroblocks is illustrated by arrows 278. As can be seen, the scanning pattern 278 for field coded macroblocks is different to the scanning pattern 276 for frame coded macroblocks. Both scanning patterns 276 and 278 define a scanning order among the transform coefficients 0 to 15.

Referring back to FIG. 5, precoder 12 proceeds in step 280 with preceding the transform coefficients in arrays 272 and 274 into sequences 282 and 284 of transform data units. The step is described in more detail with respect to FIG. 7, showing a table having four rows. In the first row, the scanning positions from 0 to 8 are listed. In a second row, an example for possible transformation coefficient levels is given for the scanning positions 0 to 8. It is assumed that the transform coefficient levels at scanning positions greater than 8 are all 0.

Now, when performing the preceding of 280 precoder 12 steps through the transform coefficients in scanning order beginning at scanning positions 0, and performs the following steps on each transformation coefficient:

1) If the transform coefficient is not 0, i.e., the transform coefficient is significant, precoder 12 sets significant_coeff_flag for this scanning position to 1. Otherwise, precoder 12 sets significant_coeff_flag to zero. As can be seen, the first transform coefficient level at scanning position 0 is 9 so that, as can be seen in the third row in FIG. 7, significant_coeff_flag for this scanning position is 1.

2. For significant transform coefficients, it is proved as to whether this transform coefficient is the last significant transform coefficient among the transform coefficients in scanning order. If this is the case, a last_significant_coeff_flag for the current scanning position created and set to 1. Otherwise, last_significant_coeff_flag for the current scanning position is set to 0. As can be seen in the last row of FIG. 7, in the present example, the last transform coefficient level being significant is the transform coefficient at scanning position 8. Therefore, the last_significant_coeff_flag for this transform coefficient is set to 1, whereas the last_significant_coeff_flag for the other significant transform coefficient at scanning position 0, 2, 3, and 6 is set to 0.

3. For all significant transform coefficient, precoder 12 creates syntax elements that specify these transform coefficients.

To summarise, precoder 12 creates for each transform coefficient from the first scanning position to the scanning position of the last significant transform coefficient a transform data unit composed of either a significant_coeff_flag, if the respective transform coefficient is not significant, and of a significant_coeff_flag, last_significant_coeff_flag and data specifying the value of the respective transform coefficient in case of the transform coefficient being significant. All syntax elements significant_coeff_flag and last_significant_coeff_flag such obtained form the significance map indicating the scanning positions of transform coefficients being significant.

Precoder 12 incorporates sequences 282 and 284 into a linear stream of syntax elements, i.e. the precoded video signal 286. The order of the syntax elements is as follows:

In general, first, the syntax elements corresponding to the significance map are transmitted followed by the values indicating the significant transform coefficients in reverse scanning order. In particular, the first syntax element of sequences 282 and 284 is the significant_coeff_flag of scanning position 0. If the transform coefficient of the scanning position 0 is significant, the significant_coeff_flag of scanning position 0 is followed by a last_significant_coeff_flag for that scanning position. Thereafter, the significant_coeff_flag of the following scanning position, i.e. scanning position 1, is transmitted and so on. After having transmitted the last_significant_coeff_flag of the last scanning position having a non-zero transform coefficient, the non-binary values for the non-zero transform coefficients are transmitted in reverse scanning order. In the example of FIG. 7, the syntax elements in syntax element stream 286 are (beginning with the first syntax elements): 1, 0, 0, 1, 0, 1, 0, 0, 0, 1, 0, 0, 1, 1, 1, −1, 3, −5, 9.

The three more syntax elements 286 is fed to entropy coder 14 which handles the syntax elements element wise. The following description is now concentrated on the handling of significant_coeff_flag and last_significant_coeff_flag. When such a flag arrives at entropy coder 14, it chooses at step 288 one of two context model sets 290 and 292 based on the scanning pattern that was used in order to map the two-dimensional transform coefficient matrix into the sequence of transform data units, which the current syntax element last_significant_coeff_flag or significant_coeff_flag belongs to. In order to perform step 288, entropy coder 14 inspects the aforementioned mb_field_decoding_flag of the current macroblock, which the current syntax element belongs to, this flag indicating as to whether the current macroblock is coded in field mode in which case the scanning pattern 278 has been used, or the current macroblock has been coded in frame mode in which case scanning pattern 276 has been used.

In the next step, entropy coder 14 assigns one context model of the chosen one of the context models sets 290 and 292 to the current syntax element to be encoded based on its scanning position. By this measure, the syntax element significant_coeff_flag for instance belonging to a scanning position 2 in sequence 282 results in a context model of context model set 290 that is different to the context model assigned to the significant_coeff_flag at scanning position 2 in sequence 284. This accounts for the different probability distributions for the syntax element significant_coeff_flag at these scanning positions due to the different scanning pattern used to define the scanning positions in sequences 282 and 284.

Finally, in step 296, the current syntax element is binary arithmetically encoded by use of the assigned context model from the chosen context model set.

In the following, with respect to FIG. 8, step 288, 294 and 296 performed by entropy coder 14 from FIG. 5 are explained in more detail.

The process shown in FIG. 8 starts at the time, where a syntax element arrives at the input of context modeller 112. In a first step 300, context modeller 112 determines as to whether the incoming syntax element or bin is a last_significant_coeff_flag. If not, context modeller 112 determines as to whether the incoming syntax element or bin is a significant_coeff_flag at step 302. If this is not the case, context modeller 112 switches to another syntax element handling procedure or subroutine at step 304. If the current syntax element is a last_significant_coeff_flag, it is checked as to whether this flag belongs to either a frame coded macroblock or field coded macroblock in step 306. Step 306 is equal to checking as to whether the scanning position of the transform coefficient to which the last_significant_coeff_flag belongs is determined by scanning pattern 276 or scanning pattern 278. The same check is performed in step 308 if, in step 302, it is determined that the syntax element is a significant_coeff_flag. Steps 300, 302, 306, and 308 restrict the possible scenarios at the arrival of a syntax element to 5 possible cases. The first case has already been mentioned and exists when the current syntax element is neither a last_significant_coeff_flag nor a significant_coeff_flag. In this case, another syntax element handling is performed in step 304. In the second case, the syntax element is a last_significant_coeff_flag belonging to a field code macroblock in which case, a context index offset value is set to a value offset1 in step 310. In a third case the current syntax element is a last_significant_coeff_flag belonging to a frame coded macroblock, where an index ctxIdx Offset is set to offset2 in step 312. Similarly, in a forth and fifth case, the syntax element is a significant_coeff_flag belonging to a field coded or frame coded macroblock, where index ctxIdx Offset is set to offset3 in step 340 and to offset4 in step 316, respectively. The index ctxIdx Offset is for pointing into on common list of context models. The values offset1 to offset4 are different to each other.

After steps 310 to 316, an index incrementor ctxIdxInc (context index incrementor) is set equal to the scanning position (scanningPos) which the syntax element, i.e., the last_significant_coeff_flag or significant_coeff_flag, belongs to, in step 318. Afterwards, in step 320, an context index is determined by the sum of the context index offset ctxIdx Offset and the index incrementor ctxIdx Inc. The steps 300 to 320 are performed by context modeller 112. The result of step 320 is a context index ctxIdx indicating the probability model to be used for binary arithmetic coding of the syntax element.

After the determination of ctxIdx, context modeller 112 passes the variable ctxIdx or the probability estimation status indexed by ctxIdx along with the syntax element itself, i.e. with last_significant_coeff_flag or significant_coeff_flag, to regular coding engine 118. Based on these inputs, the regular coding engine 118 arithmetically encodes, in step 322, the syntax element into the bit stream 124 by using the current probability state of the context model as indexed by ctxIdx.

Thereafter, regular coding engine 118 passes the bin value of last_significant_coeff_flag or significant_coeff_flag, respectively, via path 117 back to context modeller 112, whereupon context modeller 112 adapts, in step 324, the context model indexed by ctxIdx with respect to its probability estimation state. Thereafter, the process of coding the last_significant_coeff_flag or significant_coeff_flag into the bit stream at the output 124 ends at 326.

As may be clear from the above, steps 300 to 316 belong to step 288 of FIG. 5, while steps 318 and 320 belong to step 294 and steps 322 and 324 belong to step 296.

The steps 322 and 324, encompassed by dotted line 328 in FIG. 8, are explained in more detail below with respect to FIG. 9.

FIG. 9 shows, on the left hand side, a flow diagram of the process 324. On the right hand side, FIG. 9 shows a memory 326 to which both, the context modeller 112 and the regular coding engine 118, have access in order to load, write, and update specific variables. These variables comprise R and L, which define the current state or current probability interval of the binary arithmetical coder 100c. In particular, R denotes the current interval range R, while L denotes the base or lower end point of current probability interval. Thus, the current interval of the binary arithmetic coder 100c extends from L to L+R.

Furthermore, memory 328 contains a table 329, which associates each possible value of ctxIdx, e.g. 0-398, a pair of a probability state index σ_and an MPS value ω, both defining the current probability estimation state of the respective context model indexed by the respective context index ctxIdx. The probability state σ is an index that uniquely identifies one of a set of possible probability values $p_\sigma$. The probability values $p_\sigma$ are an estimation for the probability of the next bin of that context model to be a least probable symbol (LPS). Which of the possible bin values, i.e., a null or one, is meant by the LPS, is indicated by the value of MPS ω. If ω is 1, LPS is 0 and vice-versa. Thus, the state index and MPS together uniquely define the actual probability state or probability estimation of the respective context model. Both variables divide the actual interval L to L+R into two sub-intervals, namely the first sub-interval running from L to $L+R\cdot(1-p_\sigma)$ and the second interval running from $L+R\cdot p_\sigma$ to L+R. The first or lower sub-interval corresponds to the most probable symbol whereas the upper sub-interval corresponds to the least probable symbol. Exemplary values for $p_\sigma$ are derivable from the following recursive equation, with α being a value between about 0.8 to 0.99, and preferably being $\alpha=(0.01875/0.5)^{1/63}$, σ being an integer from 1 to 63: $p_\sigma=\alpha\cdot p_{\sigma-1}$, for all σ=1, ..., 63, and $p_0=0.5$.

Now in a first step 330, the range $R_{LPS}$ of the lower sub-interval is determined based on R and the probability state corresponding to the chosen context model indexed by ctxIdx, later on called simply $\sigma_i$, with i being equal to ctxIdx. The determination in step 330 may comprise a multiplication of R with $p_{\sigma^i}$. Nevertheless, in accordance with an alternative embodiment, the determination in step 330 could be conducted by use of a table, which assigns to each possible pair of probability state index $\sigma_i$ and a variable ρ a value for $R_{LPS}$, such a table being shown at 332. The variable ρ would be a measure for the value of R in some coarser units then a current resolution by which R is represented.

After having determined $R_{LPS}$, in step 334, regular coding engine 118 amends R to be $R-R_{LPS}$, i.e., to be the range of the lower sub-interval.

Thereafter, in step 336, the regular coding engine 118 checks as to whether the value of the actual bin, i.e. significant_coeff_flag or last_significant_coeff_flag, is equal to the most probable symbol as indicated by $\omega_i$ or not. If actual bin is the MPS, L needs not to be updated and the process transitions to step 338, where context modeller 112 updates the probability estimation state of the current context model by updating $\sigma_i$. In particular, context modeller 112 uses a table 340 which associates each probability state index σ with an updated probability state index in case the actual symbol or bin was the most probable symbol, i.e., σ becomes transIdxMPS($\sigma_i$).

After step 338, the process ends at 340 where bits or a bit are added to the bit stream if possible. To be more specific, a bit or bits are added to the bit stream in order to indicate a probability value falling into the current interval as defined by R and L. In particular, step 340 is performed such that at the end of a portion of the arithmetic coding of a precoded video signal, such as the end of a slice, the bit stream defines a codeword defining a value that falls into the interval [L, L+R), thereby uniquely identifying to the decoder the bin values having been encoded into the codeword. Preferably, the codeword defines the value within the current interval having the shortest bit length. As to whether a bit or bits are added to the bit stream in step 340 or not, depends on the fact as to whether the value indicated by the bit stream will remain constant even if the actual interval is further subdivided with respect to subsequent bins, i.e. as to whether the respective bit of the representation of the value falling in the current interval does not change whatever subdivisions will come.

If in step 336 it is determined that the actual bin is the least probable symbol LPS, the regular coding engine 118 actualizes the current encoder state R and L in step 342 by amending L to be L+R and R to be $R_{LPS}$. Then, if $\sigma_i$ is equal to 0, i.e. if the probability state index indicates equal probability for both, 1 and 0, in step 344, the value MPS is updated by computing $\omega_i=1-\omega_i$. Thereafter, in step 346, the probability state index is actualised by use of table 340, which also associates each current probability state index with an updated probability state index in case the actual bin value is the least probable symbol, i.e., amending $\sigma_i$ to become transIdxLPS($\sigma_i$). After the probability state index $\sigma_i$ and $\omega_i$ has been adapted in steps 344 and 346, the process steps to step 340 which has already been described.

After having described how to encode bit flag significant_coeff_flag or last_significant_coeff_flag into an arithmetically coded bit stream, the decoding of said bit stream and the retrieval of the flag is described with respect to FIGS. 10 to 13.

FIG. 10 shows a general view of a video decoder environment to which the present invention could be applied. An entropy decoder 400 receives the arithmetically coded bit stream as described above and treats it as will be described in more detail below with respect to FIGS. 11-13. In particular, the entropy decoder 400 decodes the arithmetically coded bit stream by binary arithmetic decoding in order to obtain the precoded video signal and, in particular, syntax elements contained therein and passes same to a precode decoder 402. The precode decoder 402 uses the syntax elements, such as motion vector components and flags, such as the significant_coeff_flag or last_significant_coeff_flag, in order to retrieve, macroblock by macroblock and then slice after slice, the picture samples of pixels of the video frames 10.

Before explaining in more detail the actual decoding process, the parsing process is illustrated with respect to FIG. 11 which shows a pseudo-C code for the parsing process performed in entropy decoder 400. The parsing process shown in FIG. 11 is appropriate for parsing a significance map along with its corresponding coefficient values for a macroblock provided that the significance map and the coefficient values are coded in the way explained above with respect to FIG. 7, i.e., the significance map following the scanning order and preceding the coefficient values of the significant transform coefficients which are ordered in reverse scanning order.

In FIG. 11, variables that are written in bold are read from the arithmetically coded bit stream arriving at entropy decoder 400. For reading, binary arithmetic decoding is used. The reading process is shown in more detail for bins significant_coeff_flag and a last_significant_coeff_flag in FIGS. 12 and 13. The parsing process is called residual_block_CABAC as can be seen in line 1 of the pseudo-C code of FIG. 11. The output of the process residual_block_CABAC is an one-dimensional array coeffLevel indicating the transform coefficient levels for each scanning position like shown in FIG. 7. As an input, the process residual_block_CABAC receives the variable maxNumCoeff which indicates the maximum number of coefficients in a macroblock, in our case being 16.

The process then starts in line 2 with reading a flag called coded_block_flag indicating as to whether in the current block all transform coefficient levels are zero. In this case, coded_block_flag is zero otherwise the coded_block_flag is one. In the following it is assumed that coded_block_flag is one so that at least one transform coefficient level is not zero. So, in line 4, a variable NumCoeff is set to maxNumCoeff. This means that when in the following when-do-loop no last_significant_coeff_flag being equal to one is read, the scanning position of the last significant transform coefficient is equal to the maximum number of coefficients maxNumCoeff. In line 5, a counter i is initialised to zero. In a following while-do-loop starting at line 6, firstly, one bin is read and inputted into significant_coeff_flag. With regard to FIG. 11, significant_coeff_flag is a one-dimensional array. The bin read in line 7 is put into position i of array significant_coeff_flag, i.e., significant_coeff_flag[i]. If significant_coeff_flag[i] is one (line 8), i.e., the coefficient at scanning position i is significant, the next bin is read from the bit stream, i.e., last_significant_coeff_flag[i]. If last_significant_coeff_flag[i] is one (line 10), i.e., the transform coefficient at scanning position i is the last significant transform coefficient in scanning order, the variable NumCoeff is set to i+1 in line 11 and coeffLevel also being an one-dimensional array is set to zero at all positions greater than or equal to i+1 (lines 12 and 13). This means that beyond the scanning position where last_significant_coeff_flag is one, the transform coefficient of all following scanning positions are zero.

After both if-clauses (lines 14 and 15) the counter i is incremented in line 16. At the end, at line 17, it is proved as to whether counter i is greater than or equal to NumCoeff-1. If this is the case, the while-do-loop is repeated once again. Thus, in lines 5 to 17, the significance map is read from the bit stream. Following, at line 18, the first significant transform coefficient level minus 1 is read, i.e., coeff_ups_level_minus1, followed by the sign flag coeff_sign_flag. To be more specific, both syntax elements coeff_abs_level_ups_minus1 and coeff_sign_flag read in lines 18 and 19 concern the last significant transform coefficient in scanning order. The actual value of this transform coefficient is computed in line 20. Then, in the for-loop from lines 21 to 28, the remaining significant transform coefficients are read from the bit stream by use of the significance map as received in lines 4 to 17. The counter of the for-loop i is initialised to NumCoeff-2, i.e., the scanning position immediately preceding the scanning position of the last significant transform coefficient. This counter is decremented after each for-loop-transition. If significant_coeff_flag[i] is one (line 22) the coefficient level of the transform coefficient at scanning position i is determined in lines 23 to 25, these lines being in effect, identical to lines 18 to 20. If significant_coeff_flag[i] is zero (line 26), the coefficient level of the scanning position is set to zero in line 27.

FIG. 12 now shows the decoding process performed by the entropy decoder 400 each time a bin is to be decoded. Which bin is to be decoded depends on the syntax element which is currently expected by entropy decoder 400. With regard to the significance map and the corresponding non-zero transform coefficient levels this knowledge results from the parsing process of FIG. 11.

In the decoding process, first, in step 500, the decoder 400 checks as to whether the next bin to decode is a last_significant_coeff_flag. If this is not the case, the checks in step 502 as to whether the next bin to decode is a significant_coeff_flag. The next bin to decode is a significant_coeff_flag. If the next bin to decode is either a last_significant_coeff_flag or a significant_coeff_flag, decoder 400 checks as to whether the flag belongs to a frame coded or field coded macroblock in step 504 or 506, respectively. If the next bin to decode is none of a last_significant_coeff_flag and significant_coeff_flag, decoder 400 proceeds to another syntax element handling in step 504. The checks of steps 500, 502, 506, and 508 correspond to steps 300, 302, 306, and 308 of the encoding process of FIG. 8, and accordingly, depending on the next bin to decode being a last_significant_coeff_flag or a significant_coeff_flag and the corresponding macroblock being frame coded or field coded, ctxIdx Offset is set to 1 of offset1, offset2, offset3, and offset4 in one of steps 510, 512, 514, and 516, respectively, with steps 510-516 corresponding to steps 310 to 316 of FIG. 8. Accordingly, ctxIdxInc and ctxIdx is determined in steps 518 and 520 in the same way as in the encoding process of FIG. 8 in steps 318 and 320 in order to determine the context model to be used in the following arithmetical decoding.

Then, in step 522, the entropy decoder 400 arithmetically decodes the actual bin, i.e., last_significant_coeff_flag or significant_coeff_flag, from the arithmetically coded bit stream by use of the actual probability state of the context module as indexed by ctxIdx obtained in steps 510 to 520. The result of this step is the value for the actual bin.

Thereafter, in step 524, the ctxIdx probability state is adapted or updated, as it was the case in step 224. Thereafter, the process ends at step 526.

Although in the above decoding process, step 527, i.e. the decoding of mb_filed_decoding_flag, seems to have take place after the decoding of each bin, this is not the case. In fact, this step occurs, at maximum, merely for one macroblock pair.

FIG. 13 shows the steps 522 and 524 being encompassed by dotted line 527 in more detail on the left hand side. On the right hand side, indicated with 564, FIG. 11 shows a memory and its content to which entropy decoder 400 has access in order to load, store and update variables. As can be seen, entropy decoder manipulates or manages the same variables as entropy coder 14 since entropy decoder 400 emulates the encoding process as will be described in the following.

In a first step 566, decoder 400 determines the value $R_{LPS}$, i.e. the range of the subinterval corresponding to the next bin being the LPS, based on R and $\sigma_i$. Thus, step 566 is identical to step 330. Then, in step 568, decoder 400 computes $R_{MPS} = R - R_{LPS}$ with $R_{MPS}$ being the range of the subinterval associated with the most probable symbol. The actual interval from L to R is thus subdivided into subintervals L to $L + R_{MPS}$ and $L + R_{MPS}$ to L+R. Now, in step 570 decoder 400 checks as to whether the value of the arithmetic coding codeword in the arithmetically coded bit stream falls into the lower or upper subinterval. The decoder 400 knows that the actual symbol or bin, i.e. significant_coeff_flag or last_significant_coeff_flag, is the most probable symbol as indicated by $\omega_i$ when the value of the arithmetic codeword falls into the lower subinterval and accordingly sets mb_field_decoding_flag to the value of $\omega_i$ in step 572. In case the value falls into the upper subinterval, decoder 400 sets the symbol to be $1-\omega_i$ in step 574. After step 572, the decoder 400 actualises the decoder state or the current interval as defined by R and L by setting R to be $R_{MPS}$ in step 574. Then, in step 576, the decoder 400 adapts or updates the probability state of the current context model i as defined by $\sigma_i$ and $\omega_i$ by transitioning the probability state index $\sigma_i$ as was described with respect to step 338 in FIG. 9. Thereafter, the process 527 ends at step 578.

After step 574, the decoder actualises the decoder state in step 580 by computing L=L+R and $R = R_{LPS}$. Thereafter, the decoder 400 adapts or updates the probability state in steps 582 and 584 by computing $\omega_i = 1 - \omega_i$ in step 582, if $\sigma_i$ is equal to 0, and transitioning the probability state index $\sigma_i$ to a new probability state index in the same way as described with respect to step 346 in FIG. 9. Thereafter, the process ends at step 578.

After having described the present invention with respect to the specific embodiments, it is noted that the present invention is not restricted to these embodiments. In particular, the present invention is not restricted to flags indicating the transform coefficient level of a specific scanning position being significant or not (significant_coeff_flag) or the significant transform coefficient level of a specific scanning position being the last one in scanning order (last_significant_coeff_flag). Rather, the present invention is applicable to all syntax elements or transform data units that are defined to be related to a specific transform coefficient at a specific scanning position. This could be, for example, the transform coefficient level itself, although, in accordance with the above embodiments, the bins of the syntax elements coeff_ups_level_minus1 are encoded and decoded by means of context models which are determined based on neighboring transform coefficients and not based on the scanning position.

In particular, other block sizes than 4×4 blocks could be used as a basis for the transformation. Moreover, although in the above embodiment the transformation supplied to picture sample differences to a prediction, the transformation could be as well applied to the picture sample itself without performing a prediction. Furthermore, other transformations than DCT may be used. Furthermore, with respect to the variables offset 1 to offset 4 the following is noted. It is just necessary that these offsets are different but it is not necessary that the difference between them is greater than the maximum scanning position, i.e., the maximum number of transform coefficients.

In accordance with the present invention, two sets of context models shall be deemed to be different as long as they differ in just one context module or if they differ in the association between scanning position on the one hand and context modules on the other hand. Furthermore, the present invention is not restricted to binary arithmetic encoding/decoding. The present invention can be applied to multi-symbol arithmetic encoding as well. Additionally, the sub-divisions of the video frame into slices, macroblock pairs, macroblocks, picture elements etc. was for illustrating purposes only, and this is not to restrict the scope of the invention to this special case.

In the following, reference is made to FIG. 14 to show, in more detail than in FIG. 1, the complete setup of a video encoder engine including an entropy-encoder as it is shown in FIG. 14 in block 800 in which the aforementioned arithmetic coding of mb_field_decoding_flag is used. In particular, FIG. 14 shows the basic coding structure for the emerging H.264/AVC standard for a macroblock. The input video signal is, split into macroblocks, each macroblock having 16×16 pixels. Then, the association of macroblocks to slice groups and slices is selected, and, then, each macroblock of each slice is processed by the network of operating blocks in FIG. 14. It is to be noted here that an efficient parallel processing of macroblocks is possible, when there are various slices in the picture. The association of macroblocks to slice groups and slices is performed by means of a block called coder control 802 in FIG. 14. There exist several slices, which are defined as follows:

I slice: A slice in which all macroblocks of the slice are coded using intra prediction.

P slice: In addition, to the coding types of the I slice, some macroblocks of the P slice can also be coded using inter prediction with at most one motion-compensated prediction signal per prediction block.

B slice: In addition, to the coding types available in a P slice, some macroblocks of the B slice can also be coded using inter prediction with two motion-compensated prediction signals per prediction block.

The above three coding types are very similar to those in previous standards with the exception of the use of reference pictures as described below. The following two coding types for slices are new:

SP slice: A so-called switching P slice that is coded such that efficient switching between different precoded pictures becomes possible.

SI slice: A so-called switching I slice that allows an exact match of a macroblock in an SP slice for random access and error recovery purposes.

Slices are a sequence of macroblocks, which are processed in the order of a raster scan when not using flexible macroblock ordering (FMO). A picture maybe split into one or several slices as shown in FIG. 16. A picture is therefore a collection of one or more slices. Slices are self-contained in the sense that given the active sequence and picture parameter sets, their syntax elements can be parsed from the bit stream and the values of the samples in the area of the picture that the slice represents can be correctly decoded without use of data from other slices provided that utilized reference pictures are identical at encoder and decoder. Some information from other slices maybe needed to apply the deblocking filter across slice boundaries.

FMO modifies the way how pictures are partitioned into slices and macroblocks by utilizing the concept of slice groups. Each slice group is a set of macroblocks defined by a macroblock to slice group map, which is specified by the content of the picture parameter set and some information from slice headers. The macroblock to slice group map consists of a slice group identification number for each macroblock in the picture, specifying which slice group the associated macroblock belongs to. Each slice group can be partitioned into one or more slices, such that a slice is a sequence of macroblocks within the same slice group that is processed in the order of a raster scan within the set of macroblocks of a particular slice group. (The case when FMO is not in use can be viewed as the simple special case of FMO in which the whole picture consists of a single slice group.)

Using FMO, a picture can be split into many macroblock-scanning patterns such as interleaved slices, a dispersed macroblock allocation, one or more "foreground" slice groups and a "leftover" slice group, or a checker-board type of mapping.

Each macroblock can be transmitted in one of several coding types depending on the slice-coding type. In all slice-coding types, the following types of intra coding are supported, which are denoted as Intra_4×4 or Intra_16×16 together with chroma prediction and I_PCM prediction modes.

The Intra_4×4 mode is based on predicting each 4×4 luma block separately and is well suited for coding of parts of a picture with significant detail. The Intra_16×16 mode, on the other hand, does prediction of the whole 16×16 luma block and is more suited for coding very smooth areas of a picture.

In addition, to these two types of luma prediction, a separate chroma prediction is conducted. As an alternative to Intra_4×4 and Intra_16×16, the I_PCM coding type allows the encoder to simply bypass the prediction and transform coding processes and instead directly send the values of the encoded samples. The I_PCM mode serves the following purposes:
 1. It allows the encoder to precisely represent the values of the samples
 2. It provides a way to accurately represent the values of anomalous picture content without significant data expansion
 3. It enables placing a hard limit on the number of bits a decoder must handle for a macroblock without harm to coding efficiency.

In contrast to some previous video coding standards (namely H.263+ and MPEG-4 Visual), where intra prediction has been conducted in the transform domain, intra prediction in H.264/AVC is always conducted in the spatial domain, by referring to the bins of neighboring samples of previously coded blocks which are to the left and/or above the block to be predicted. This may incur error propagation in environments with transmission errors that propagate due to motion compensation into inter-coded macroblocks.

Therefore, a constrained intra coding mode can be signaled that allows prediction only from intra-coded neighboring macroblocks.

When using the Intra_4×4 mode, each 4×4 block is predicted from spatially neighboring samples as illustrated on the left-hand side of FIG. 17. The 16 samples of the 4×4 block, which are labeled as a-p, are predicted using prior decoded samples in adjacent blocks labeled as A-Q. For each 4×4 block one of nine prediction modes can be utilized. In addition, to "DC" prediction (where one value is used to predict the entire 4×4 block), eight directional prediction modes are specified as illustrated on the right-hand side of FIG. 15. Those modes are suitable to predict directional structures in a picture such as edges at various angles.

In addition, to the intra macroblock coding types, various predictive or motion-compensated coding types are specified as P macroblock types. Each P macroblock type corresponds to a specific partition of the macroblock into the block shapes used for motion-compensated prediction. Partitions with luma block sizes of 16×16, 16×8, 8×16, and 8×8 samples are supported by the syntax. In case partitions with 8×8 samples are chosen, one additional syntax element for each 8×8 partition is transmitted. This syntax element specifies whether the corresponding 8×8 partition is further partitioned into partitions of 8×4, 4×8, or 4×4 luma samples and corresponding chroma samples.

The prediction signal for each predictive-coded M×N luma block is obtained by displacing an area of the corresponding reference picture, which is specified by a translational motion vector and a picture reference index. Thus, if the macroblock is coded using four 8×8 partitions and each 8×8 partition is further split into four 4×4 partitions, a maximum of sixteen motion vectors may be transmitted for a single P macroblock.

The quantization parameter SliceQP is used for determining the quantization of transform coefficients in H.264/AVC. The parameter can take 52 values. Theses values are arranged so that an increase of 1 in quantization parameter means an increase of quantization step size by approximately 12% (an increase of 6 means an increase of quantization step size by exactly a factor of 2). It can be noticed that a change of step size by approximately 12% also means roughly a reduction of bit rate by approximately 12%.

The quantized transform coefficients of a block generally are scanned in a zig-zag fashion and transmitted using entropy coding methods. The 2×2 DC coefficients of the chroma component are scanned in raster-scan order. All inverse transform operations in H.264/AVC can be implemented using only additions and bit-shifting operations of 16-bit integer values. Similarly, only 16-bit memory accesses are needed for a good implementation of the forward transform and quantization process in the encoder.

The entropy encoder 800 in FIG. 14 in accordance with a coding arrangement described above with respect to FIG. 2. A context modeler feeds a context model, i.e., a probability information, to an arithmetic encoder, which is also referred to as the regular coding engine. The to be encoded bit, i.e. a bin, is forwarded from the context modeler to the regular coding engine. This bin value is also fed back to the context modeler so that a context model update can be obtained. A bypass branch is provided, which includes an arithmetic encoder, which is also called the bypass coding engine. The bypass coding engine is operative to arithmetically encode the input bin values. Contrary to the regular coding engine, the bypass coding engine is not an adaptive coding engine but works preferably with a fixed probability model without any context adaption. A selection of the two branches can be obtained by means of switches. The binarizer device is operative to binarize non-binary valued syntax elements for obtaining a bin string, i.e., a string of binary values. In case the syntax element is already a binary value syntax element, the binarizer is bypassed.

Therefore, in CABAC (CABAC=Context-based Adaptive Binary Arithmetic Coding) the encoding process consists of at most three elementary steps:

1. binarization
2. context modeling
3. binary arithmetic coding

In the first step, a given non-binary valued syntax element is uniquely mapped to a binary sequence, a so-called bin string. When a binary valued syntax element is given, this initial step is bypassed, as shown in FIG. 2. For each element of the bin string or for each binary valued syntax element, one or two subsequent steps may follow depending on the coding mode.

In the co-called regular coding mode, prior to the actual arithmetic coding process the given binary decision, which, in the sequel, we will refer to as a bin, enters the context modeling stage, where a probability model is selected such that the corresponding choice may depend on previously encoded syntax elements or bins. Then, after the assignment of a context model the bin value along with its associated model is passed to the regular coding engine, where the final stage of arithmetic encoding together with a subsequent model updating takes place (see FIG. 2).

Alternatively, the bypass coding mode is chosen for selected bins in order to allow a speedup of the whole encoding (and decoding) process by means of a simplified coding engine without the usage of an explicitly assigned model. This mode is especially effective when coding the bins of the primary suffix of those syntax elements, concerning components of differences of motion vectors and transform coefficient levels.

In the following, the three main functional building blocks, which are binarization, context modeling, and binary arithmetic coding in the encoder of FIG. 14, along with their interdependencies are discussed in more detail.

In the following, several details on binary arithmetic coding will be set forth.

Binary arithmetic coding is based on the principles of recursive interval subdivision that involves the following elementary multiplication operation. Suppose that an estimate of the probability $P_{LPS} \in (0, 0.5]$ of the least probable symbol (LPS) is given and that the given interval is represented by its lower bound L and its width (range) R. Based on that settings, the given interval is subdivided into two sub-intervals: one interval of width $$R_{LPS} = R \times p_{LPS},$$

which is associated with the LPS, and the dual interval of width $R_{MPS} = R - R_{LPS}$, which is assigned to the most probable symbol (MPS) having a probability estimate of $1 - p_{LPS}$. Depending on the observed binary decision, either identified as the LPS or the MPS, the corresponding sub-interval is then chosen as the new current interval. A binary value pointing into that interval represents the sequence of binary decisions processed so far, whereas the range of the interval corresponds to the product of the probabilities of those binary symbols. Thus, to unambiguously identify that interval and hence the coded sequence of binary decisions, the Shannon lower bound on the entropy of the sequence is asymptotically approximated by using the minimum precision of bits specifying the lower bound of the final interval.

An important property of the arithmetic coding as described above is the possibility to utilize a clean interface between modeling and coding such that in the modeling stage, a model probability distribution is assigned to the given symbols, which then, in the subsequent coding stage, drives the actual coding engine to generate a sequence of bits as a coded representation of the symbols according to the model distribution. Since it is the model that determines the code and its efficiency in the first place, it is of importance to design an adequate model that explores the statistical dependencies to a large degree and that this model is kept "up to date" during encoding. However, there are significant model costs involved by adaptively estimating higher-order conditional probabilities.

Suppose a pre-defined set T_ of past symbols, a so-called context template, and a related set $C = \{0, \ldots, C-1\}$ of contexts is given, where the contexts are specified by a modeling function F. For each symbol x to be coded, a conditional probability $p(x|F(z))$ is estimated by switching between different probability models according to the already coded neighboring symbols $z \in T$. After encoding x using the estimated conditional probability $p(x|F(z))$ is estimated on the fly by tracking the actual source statistics. Since the number of different conditional probabilities to be estimated for an alphabet size of m is high, it is intuitively clear that the model cost, which represents the cost of "learning" the model distribution, is proportional to the number of past symbols to the power of four_-.

This implies that by increasing the number C of different context models, there is a point, where overfitting of the model may occur such that inaccurate estimates of $p(x|F(z))$ will be the result.

This problem is solved in the encoder of FIG. 12 by imposing two severe restrictions on the choice of the context models. First, very limited context templates T consisting of a few neighbors of the current symbol to encode are employed such that only a small number of different context models C is effectively used.

Secondly, context modeling is restricted to selected bins of the binarized symbols and is of especially advantage with respect to primary prefix und suffix of the motion vector differences and the transform coefficient levels but which is also true for other syntax elements. As a result, the model cost is drastically reduced, even though the ad-hoc design of context models under these restrictions may not result in the optimal choice with respect to coding efficiency.

Four basic design types of context models can be distinguished. The first type involves a context template with up to two neighboring syntax elements in the past of the current syntax element to encode, where the specific definition of the kind of neighborhood depends on the syntax element. Usually, the specification of this kind of context model for a specific bin is based on a modeling function of the related bin values for the neighboring element to the left and on top of the current syntax element, as shown in FIG. 13.

The second type of context models is only defined for certain data subtypes. For this kind of context models, the values of prior coded bins $(b_0, b_1, b_2, \ldots, b_{i-1})$ are used for the choice of a model for a given bin with index i. Note that these context models are used to select different models for different internal nodes of a corresponding binary tree.

Both the third and fourth type of context models is applied to residual data only. In contrast to all other types of context models, both types depend on context categories of different block types. Moreover, the third type does not rely on past coded data, but on the position in the scanning path. This design type of context modeling corresponds to the above description with respect to FIG. 1-11. For the fourth type, modeling functions are specified that involve the evaluation of the accumulated number of encoded (decoded) levels with a specific value prior to the current level bin to encode (decode).

Besides these context models based on conditional probabilities, there are fixed assignments of probability models to bin indices for all those bins that have to be encoded in regular mode and to which no context model of the previous specified category can be applied.

The above described context modeling is suitable for a video compression engine such as video compression/decompression engines designed in accordance with the presently emerging H.264/AVC video compression standard. To summarize, for each bin of a bin string the context modeling, i.e., the assignment of a context variable, generally depends on the to be processed data type or sub-data type, the precision of the binary decision inside the bin string as well as the values of previously coded syntax elements or bins. With the exception of special context variables, the probability model of a context variable is updated after each usage so that the probability model adapts to the actual symbol statistics.

A specific example for a context-based adaptive binary arithmetic coding scheme to which the assignment of context model of the above embodiments could be applied is described in: D. Marpe, G. Blättermann, and T. Wiegand, "Adaptive codes for H.26L," ITU-T SG16/Q.6 Doc. VCEG-L13, Eibsee, Germany, January 2003-07-10.

To summarize, in the above embodiments, two separate sets of the scanning position dependent context variables (probability models) for the syntax elements significant_coeff_flag and last_significant_coeff_flag are defined, one for field macroblocks and one for frame macroblocks. Each set contains all context variables (probability models) for the syntax elements significant_coeff_flag and last_significant_coeff_flag for all scanning positions and block categories specified in the H.264/AVC video coding standard. For all other syntax elements, the same set of context variables is used for both frame and field macroblocks. The variables ctxIdxInc, which specify the chosen probability model inside a set of context variables, are derived using the scanning position scanningPos within the regarded block, i.e. by computing ctxIdxInc=scanningPos. Furthermore, we specified different sets of initialization values for the scanning position dependent probability models of the syntax elements significant_coeff_flag and last_significant_coeff_flag, one for frame and another for field coded macroblocks.

FIG. 18a to FIG. 18d show tables of exemplary context model probability estimation initialization values. For each context index from 105 to 226 and 277 to 398 the tables show four pairs of initialization parameters m and n. For each context index one pair is indicated for I and SI-slices as described above. The other three pairs of initialization parameters are used for coding data in time-domain predicted B and P frames. Which of these three pairs of initialization parameters is actually used is determined by an initialization index cabac_init_idc contained in some header portions of the arithmetically encoded bit stream. In the present example, the range of ctxIdx from 105 to 165 corresponds to the bin significant_coeff_flag for frame coded macroblocks, the range of 166 to 226 to the bin last_significant_coeff_flag for frame coded macroblocks, the range of 277 belongs to the bin significant_coeff_flag for field coded macroblocks and the range of 338 to 398 to the bin last_significant_coeff_flag for field coded macroblocks.

Thus, in the above embodiments, offset 1 would be 338, offset would be 166, offset 3 would be 277 and offset 4 would be 105. Differing from the above embodiments, CtxIdx would CtxIdxoffset plus CtxIdxInc plus CtxIdx_Block_Cat_offset. ctxIdx_Block_Cat_offset would be 0,15, 29,44, or 47 depending on the type of the underlying block for transformation. In particular, ctxIdx_Block_Cat_ offset is 0 if the block is a block of luma DC coefficients of a macroblock coded in Intra 16×16 prediction mode (16), 15 if the block is a block of luma AC coefficients of a macroblock coded in Intra 16×16 prediction mode (15), 29 if the block is a block of luma DC coefficients of a macroblock not coded in Intra 16×16 prediction mode (16), 44 if the block is a block of chroma DC coefficients (4), and 47 if the block is a block of chroma AC coefficients (15), with the values in the brackets indicating the value of the maximum number of coefficients in these blocks, i.e. maxNumCoeff.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for encoding a video frame or picture, the method comprising:
   dividing up the video frame or the picture in portions of a first type and portions of a second type, wherein the portions of the first type are associated with a first scanning pattern, and the portions of the second type are associated with a second scanning pattern that is different from the first scanning pattern;
   transforming data corresponding to a predetermined of the portions of the video frame or picture into a two-dimensional array of transform coefficients, wherein a scanning order is defined among the transform coefficients by the scanning pattern of the predetermined portion, the scanning order assigning each transform coefficient a unique scanning position;
   precoding a predetermined of the transform coefficients in order to obtain a transform data unit;
   choosing one of a first and a second set of context models, depending on as to whether the predetermined portion is a portion of a type being associated with the first or the second scanning pattern, the first and the second set being different to each other;
   assigning one context model of the chosen one of the first and the second set of context models to the transform data unit based on the scanning position assigned to the predetermined transform coefficient, wherein each context model is associated with a different probability estimation; and
   arithmetically encoding the transform data unit or a sub-unit thereof into a coded bit stream based on the probability estimation with which the assigned context model is associated.

2. The method of claim 1, wherein the step of arithmetically encoding is adapted to arithmetically encode the sub-unit, and wherein the step of precoding comprises:
   checking as to whether the predetermined transform coefficient is significant;
   if the predetermined transform coefficient is significant, setting a binary significance flag to a first value; and if the predetermined transform coefficient is not significant, setting the binary significance flag to a second value being different to the first value,
wherein the significance flag is comprised by the sub-unit of the transform data unit.

3. The method of claim 1, wherein the step of arithmetically encoding is adapted to arithmetically encode the sub-unit, and wherein the step of precoding further comprises:
checking as to whether the predetermined transform coefficient is significant;
if the predetermined transform coefficient is significant,
checking as to whether the predetermined transform coefficient is the last significant transform coefficient among the transform coefficients having assigned a higher scanning position than the predetermined transform coefficient, in order to obtain a check result;
if the check result is positive, setting a binary last significant coefficient flag to a third value;
if the check result is negative, setting the binary last significant coefficient flag to a fourth value, the fourth value being different to the third value,
wherein the last significance coefficient flag is comprised by the sub-unit of the transform data unit.

4. The method of claim 1, wherein the step of precoding is comprised by a step of precoding the transform coefficients, the step of precoding the transform coefficients further comprising the following sub-steps:
a) for the first transform coefficient in scanning order, checking as to whether same is significant;
b) if the first transform coefficient is significant, setting a binary significance flag to a first value;
c) if the predetermined transform coefficient is not significant, setting the binary significance flag to a second value being different to the first value,
d) if the first transform coefficient in scanning order is significant, checking as to whether same is the last significant transform coefficient among the transform coefficients having assigned a higher scanning position than same transform coefficient, in order to obtain a check result;
e) if the check result is positive, setting a binary last significant coefficient flag of the first transform coefficient in scanning order to a third value;
f) if the check result is negative, setting the binary last significant coefficient flag to a fourth value, the fourth value being different to the third value, and
g) repeating steps a)-f) for the next transform coefficient in scanning order;
h) for all transform coefficients, the significance flag of which has the first value, coding a data value indicating the transform coefficient into the coded bit stream, wherein, for all transform coefficients, the significance flag of which has the first value, the last significant coefficient flag, the significance flag, and the data value a transform data unit, and, for the remaining transform coefficients, the significance flag forms the transform data unit.

5. The method of claim 1, wherein the data corresponding to the predetermined portion concerns a kind of pixel information, the kind of pixel information being selected of brightness, colour tone, saturation and chrominance.

6. The method of claim 1, wherein the data corresponding to the predetermined portion defines differences between the video frame or picture and a prediction of the video frame or picture with respect to the predetermined portion.

7. The method of claim 1, wherein the video frame or picture is composed of picture samples, the picture samples belonging either to a first or a second field being captured at different time instants, wherein the method comprises:
grouping picture samples belonging to either the first or second field and contained in the predetermined portion of the video frame or picture, to obtain the data corresponding to the predetermined portion or data which the data corresponding to the predetermined portion is based upon, if the predetermined portion is a portion of the first type, or grouping picture samples contained in one of two halves of the predetermined portion and comprising both, picture samples belonging to the first field and picture samples belonging to the second field, to obtain the data corresponding to the predetermined portion or data which the data corresponding to the predetermined portion is based upon, if the predetermined portion is a portion of the second type.

8. The method of claim 1, wherein the picture samples belonging to the first field and the picture samples belonging to the second field are interlaced so that picture samples as grouped if the predetermined portion is a portion of the first type, have a greater pitch than picture samples as grouped if the predetermined portion is a portion of the second type.

9. The method of claim 1, wherein the step of arithmetically encoding comprises the following steps:
deducing a current arithmetic code interval in accordance with the probability estimation with which the assigned context model is associated to one of two subintervals into which the probability estimation with which the assigned context model is associated separates the current arithmetic code interval, in order to obtain a reduced current arithmetic coding interval, wherein the coded bit stream depends on the reduced current arithmetic coding interval.

10. The method of claim 1, further comprising:
adapting the probability estimation with which the assigned context model is associated based on the syntax element.

11. The method of claim 1 further comprising:
encoding into the bit stream a flag indicating as to whether the predetermined portion is a portion of the first type or a portion of the second type.

12. A method for decoding a transform data unit or a sub-unit thereof from a coded bit stream, the transform data unit being a precoded version of a predetermined transform coefficient of transform coefficients which are the result of a transformation of data corresponding to a predetermined portion of portions of a video frame or picture, the portions being either a portion of a first type being associated with a first scanning pattern or a portion of a second type being associated with a second scanning pattern, the method comprising the following steps:
choosing one of a first and a second set of context models, depending on as to whether the predetermined portion is a portion of a type being associated with the first or the second scanning pattern, the first and the second set being different to each other;
assigning one context model of the chosen one of the first and the second set of context models to the transform data unit or the sub-unit thereof based on the scanning position assigned to the predetermined transform coefficient, wherein each context model is associated with a different probability estimation; and arithmetically decoding the transform data unit or the sub-unit thereof from the coded bit stream based on the probability estimation with which the assigned context model is associated.

13. The method of claim 12, wherein the method is for decoding the sub-unit of the transform data unit, and the sub-unit is a significance flag having a first value if the predetermined transform coefficient is significant and has a second value if the predetermined transform coefficient is not significant, the first value being different from the second value.

14. The method of claim 12, wherein the step of assigning one context model comprises a step of investigating a syntax element associated with the neighbouring portion.

15. The method of claim 12, wherein the step of arithmetically decoding comprises the following steps:
checking as to whether an arithmetic codeword value indicated by the coded bit stream falls into a first or a second of two subintervals, into which the probability estimation with which the assigned context model is associated separates a current arithmetic code interval, wherein a value of the transform data unit or the sub-unit thereof depends on the subinterval into which the arithmetic codeword value falls.

16. The method of claim 12, further comprising:
adapting the probability estimation with which the assigned context model is associated based on the transform data unit or the sub-unit thereof.

17. A computer readable medium storing a computer program product having instructions for performing, when running on a computer, a method for encoding a video frame or picture, the method comprising:
dividing up the video frame or the picture in portions of a first type and portions of a second type, wherein the portions of the first type are associated with a first scanning pattern, and the portions of the second type are associated with a second scanning pattern that is different from the first scanning pattern;
transforming data corresponding to a predetermined of the portions of the video frame or picture into a two-dimensional array of transform coefficients, wherein a scanning order is defined among the transform coefficients by the scanning pattern of the predetermined portion, the scanning order assigning each transform coefficient a unique scanning position;
precoding a predetermined of the transform coefficients in order to obtain a transform data unit;
choosing one of a first and a second set of context models, depending on as to whether the predetermined portion is a portion of a type being associated with the first or the second scanning pattern, the first and the second set being different to each other;
assigning one context model of the chosen one of the first and the second set of context models to the transform data unit based on the scanning position assigned to the predetermined transform coefficient, wherein each context model is associated with a different probability estimation; and
arithmetically encoding the transform data unit or a sub-unit thereof into a coded bit stream based on the probability estimation with which the assigned context model is associated.

18. A computer readable medium storing a computer program product having instructions for performing, when running on a computer, a method for decoding a transform data unit or a sub-unit thereof from a coded bit stream, the transform data unit being a precoded version of a predetermined transform coefficient of transform coefficients which are the result of a transformation of data corresponding to a predetermined portion of portions of a video frame or picture, the portions being either a portion of a first type being associated with a first scanning pattern or a portion of a second type being associated with a second scanning pattern, the method comprising the following steps:
choosing one of a first and a second set of context models, depending on as to whether the predetermined portion is a portion of a type being associated with the first or the second scanning pattern, the first and the second set being different to each other;
assigning one context model of the chosen one of the first and the second set of context models to the transform data unit or the sub-unit thereof based on the scanning position assigned to the predetermined transform coefficient, wherein each context model is associated with a different probability estimation; and
arithmetically decoding the transform data unit or the sub-unit thereof from the coded bit stream based on the probability estimation with which the assigned context model is associated.

19. An apparatus for encoding a video frame or picture, the method comprising:
means for dividing up the video frame or the picture in portions of a first type and portions of a second type, wherein the portions of the first type are associated with a first scanning pattern, and the portions of the second type are associated with a second scanning pattern that is different from the first scanning pattern;
means for transforming data corresponding to a predetermined of the portions of the video frame or picture into a two-dimensional array of transform coefficients, wherein a scanning order is defined among the transform coefficients by the scanning pattern of the predetermined portion, the scanning order assigning each transform coefficient a unique scanning position;
means for precoding a predetermined of the transform coefficients in order to obtain a transform data unit;
means for choosing one of a first and a second set of context models, depending on as to whether the predetermined portion is a portion of a type being associated with the first or the second scanning pattern, the first and the second set being different to each other;
means for assigning one context model of the chosen one of the first and the second set of context models to the transform data unit based on the scanning position assigned to the predetermined transform coefficient, wherein each context model is associated with a different probability estimation; and
means for arithmetically encoding the transform data unit or a sub-unit thereof into a coded bit stream based on the probability estimation with which the assigned context model is associated.

20. An apparatus for decoding a transform data unit or a sub-unit thereof from a coded bit stream, the transform data unit being a precoded version of a predetermined transform coefficient of transform coefficients which are the result of a transformation of data corresponding to a predetermined portion of portions of a video frame or picture, the portions being either a portion of a first type being associated with a first scanning pattern or a portion of a second type being associated with a second scanning pattern, the method comprising the following steps:

means for choosing one of a first and a second set of context models, depending on as to whether the predetermined portion is a portion of a type being associated with the first or the second scanning pattern, the first and the second set being different to each other;
means for assigning one context model of the chosen one of the first and the second set of context models to the transform data unit or the sub-unit thereof based on the scanning position assigned to the predetermined transform coefficient, wherein each context model is associated with a different probability estimation; and
means for arithmetically decoding the transform data unit or the sub-unit thereof from the coded bit stream based on the probability estimation with which the assigned context model is associated.

* * * * *